United States Patent
Masuda

(10) Patent No.: US 8,300,899 B2
(45) Date of Patent: Oct. 30, 2012

(54) IMAGE PROCESSING APPARATUS

(75) Inventor: Tomonori Masuda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1271 days.

(21) Appl. No.: 12/027,906

(22) Filed: Feb. 7, 2008

(65) Prior Publication Data

US 2008/0193018 A1 Aug. 14, 2008

(30) Foreign Application Priority Data

Feb. 9, 2007 (JP) ................................. 2007-031119

(51) Int. Cl.
G06K 9/00 (2006.01)
(52) U.S. Cl. ......................... 382/118; 382/103; 382/190
(58) Field of Classification Search .................. 382/103, 382/118, 190
See application file for complete search history.

(56) References Cited

U.S. PATENT DOCUMENTS

| 7,403,641 | B2 * | 7/2008 | Nakamoto et al. | ............ 382/118 |
| 7,796,786 | B2 * | 9/2010 | Kakinuma et al. | ............ 382/118 |
| 2004/0081338 | A1 | 4/2004 | Takenaka | |
| 2006/0008145 | A1 * | 1/2006 | Kaku | ............. 382/173 |
| 2006/0126964 | A1 * | 6/2006 | Chen | ............. 382/286 |
| 2007/0041610 | A1 * | 2/2007 | Kaneko et al. | ................ 382/100 |

FOREIGN PATENT DOCUMENTS

| EP | 1 338 802 A2 | 2/2004 |
| JP | 2003-46745 A | 2/2003 |
| JP | 2004-62560 A | 2/2004 |
| JP | 2005-286468 | 10/2005 |
| JP | 2006-338467 A | 12/2006 |
| JP | 2007-18386 A | 1/2007 |
| JP | 2007-213177 A | 8/2007 |
| JP | 2008-42713 A | 2/2008 |
| JP | 2008-90447 A | 4/2008 |
| JP | 2008-160354 A | 7/2008 |

* cited by examiner

Primary Examiner — Gregory M Desire
(74) Attorney, Agent, or Firm — Birch, Stewart, Kolasch & Birch, LLP

(57) ABSTRACT

According to an image processing apparatus of an aspect of the present invention, when an image is transmitted, a face image of a person whose privacy is guarded is automatically masked, or information of an area to be masked is transferred to an external device with an image, so that an image in which the privacy is guarded without a user operation can be transmitted to an external device.

27 Claims, 24 Drawing Sheets

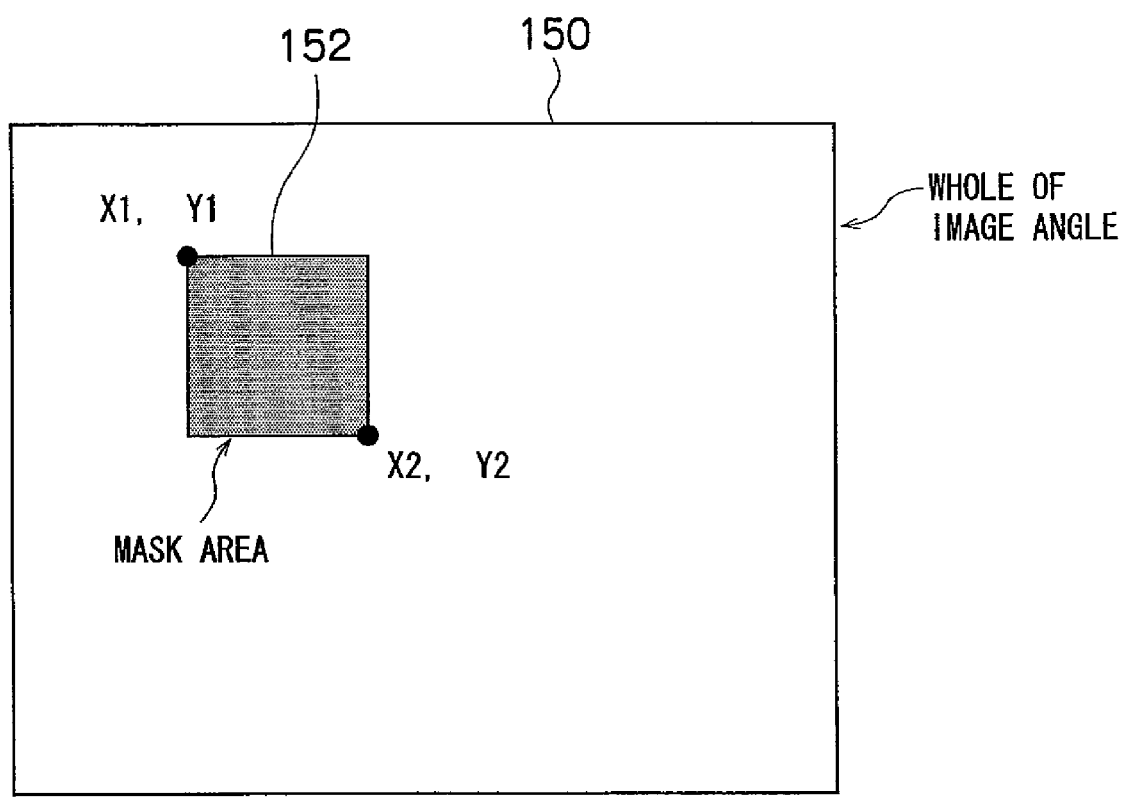

IMAGE PROCESSING APPARATUS

BACKGROUND OF THE INVENTION

1. Field of the Invention

The present invention relates to an image processing apparatus, particularly, to an image processing apparatus including a function for transferring an image photographed by a camera, and the like to an external device through a communication line such as a portable telephone line or the Internet.

2. Description of the Related Art

In recent years, in a digital camera mounting a wireless LAN function, a portable telephone with a camera, and the like, it has been possible to transmit an image photographed by a camera to an external device not through other device such as a personal computer by utilizing a communication line such as a portable telephone line and the Internet. Thus, it has been easy to release an image photographed by a user to the general public persons, so that such a possibility has been induced that the personal privacy of an unspecified person unintentionally appearing in a photographed image is violated.

The following technologies are proposed in Japanese Patent Application Laid-Open No. 2004-62560 and Japanese Patent Application Laid-Open No. 2003-46745 as technologies which do not release persons and objects appearing in a photographed image. Japanese Patent Application Laid-Open No. 2004-62560 discloses an apparatus which detects a face image from an image photographed by a camera, compares the detected face image with a face image of a previously-registered specific person, when the face images correspond to each other, does not mask (abstract) the face image, and when the face images do not correspond to each other, masks the face image.

Japanese Patent Application Laid-Open No. 2003-46745 discloses an image processing apparatus which accumulates images, when an image is required to be transmitted from an operation terminal, masks a required part of an image to be transmitted, and changes content of the masking (the largeness of a masked area, and the like) depending on the level of a user using the operation terminal.

SUMMARY OF THE INVENTION

However, according to Japanese Patent Application Laid-Open No. 2004-62560, a face of a person other than a previously-registered specific person is masked, so that there has been such a fault that a face of a person whose face image is not registered is always masked.

The technology according to Japanese Patent Application Laid-Open No. 2003-46745 can be applied when an object appearing in a photographed image is pre-determined, and cannot be applied to an image photographed in an image angle which is arbitrarily determined by a user.

The present invention has been achieved in consideration of such circumstances, and an object of the present invention is to provide an image processing apparatus which can securely mask a face of a person, whose personal privacy is guarded, with an easy user operation.

To achieve the above object, an image processing apparatus according to a first aspect of the present invention includes an image inputting device which inputs an image, a face image detecting device which detects a face image of a person from the image inputted by the image inputting device, an automatic mask deciding device which decides whether or not each of face images is to be masked based on the estimation of the importance on a photographing composition of each of the face images detected by the face image detecting device, or the number of other images in which the same person appears, and a transferring device which transfers an image obtained by masking an area of a face image which is decided to be masked by the automatic mask deciding device for the image inputted by the image inputting device to an external device, or transfers the image inputted by the image inputting device and information indicating the area of the face image which is decided to be masked by the automatic mask deciding device to an external device.

According to the first aspect, when an image is transmitted, a face image of a person whose privacy is guarded is automatically masked, or information of an area to be masked is transferred to an external device with an image, so that an image in which the privacy is guarded without a user operation can be transmitted to an external device.

An image processing apparatus according to a second aspect of the present invention includes the image inputting device which inputs an image, the face image detecting device which detects a face image of a person from the image inputted by the image inputting device, a displaying device which displays an operation screen, which displays each area which is detected as a face image by the face image detecting device so as to be able to be identified, and in which a user inputs a decision whether or not each of face images detected by the face image detecting device is to be masked, a manual mask deciding device which decides whether or not each of face images detected by the face image detecting device is to be masked depending on a user operation on a screen of the displaying device, and a transferring device which transfers an image obtained by masking an area of a face image which is decided to be masked by the manual mask deciding device for the image inputted by the image inputting device to an external device, or transfers the image inputted by the image inputting device, and information indicating the area of the face image which is decided to be masked by the manual mask deciding device to an external device.

According to the second aspect, when an image is transmitted, a user can transfer an image to an external device, in which the privacy is securely guarded only with an easy operation for selecting whether or not each of face images in the image is masked.

An image processing apparatus according to a third aspect of the present invention includes the image inputting device which inputs an image, the face image detecting device which detects a face image of a person from the image inputted by the image inputting device, an automatic mask deciding device which automatically decides whether or not each of face images detected by the face image detecting device is to be masked, a displaying device which displays an operation screen for displaying each area detected as a face image by the face image detecting device so as to be able to be identified, and for displaying an area of a face image decided to be masked by the automatic mask deciding device, and an area of a face image decided not to be masked so as to be able to be identified, the operation screen in which a user inputs a decision whether or not each of face images detected by the face image detecting device is masked, an manual mask deciding device which corrects the decision result by the automatic mask deciding device whether or not each of face images detected by the face image detecting device is to be masked depending on a user operation on a screen of the displaying device, and decides whether or not each image detected by the face image detecting device is to be masked, and the transferring device which transfers an image obtained by masking an area of a face image which is decided to be masked by the manual mask deciding device for the image inputted by the image inputting device to an external device, or transfers the image inputted by the image inputting device, and information indicating the area of the face image which is decided to be masked by the manual mask deciding device to an external device.

The third aspect is accomplished by combining the invention according to the first aspect and the invention according to the second aspect, semi-automates the decision whether or not each of face images of an image to be transmitted is to be masked, causes a user to be able to correct an automatic decision, and to be able to appropriately select an face image to be masked.

An image processing apparatus according to a fourth aspect of the present invention is, in the invention according to the first aspect, characterized in that the automatic mask deciding device decides whether or not each of face images is masked based on a largeness, the number, a position in an image angle, or a direction of a face of each of face images detected by the face image detecting device.

The fourth aspect illustrates an embodiment of the processing of an automatic mask deciding (an automatic decision whether or not each of face images is to be masked), and decides in consideration of the importance as a photographing composition of each of face images in an image.

An image processing apparatus according to a fifth aspect of the present invention is, in the invention according to the first aspect, characterized in that the automatic mask deciding device decides whether or not an image to be decided is to be masked depending on whether or not a face image of the same person whose face image is the same as each of face images detected by the face image detecting device appears in a prescribed number or more images of other already-recorded images.

The fifth aspect illustrates an embodiment of such an automatic mask deciding that when a face image of the same person appears in the prescribed number or more images, it is highly possible that the person is intentionally photographed, so that the face image is not to be masked.

An image processing apparatus according to a sixth aspect of the present invention is, in the invention according to the first aspect, characterized in that when an image inputted by the image inputting device is a moving image including a plurality of frame images, the automatic mask deciding device decides whether or not each frame image is to be masked depending on whether or not a face image of the same person detected by the face image detecting device appears in a prescribed number or more frame images.

In the moving image, the sixth aspect illustrates an embodiment of such an automatic mask deciding that when a face image of the same person appears in the prescribed number or more images, it is highly possible that the person is intentionally photographed, so that the face image is not masked.

An image processing apparatus according to a seventh aspect of the present invention is, in the invention according to the third aspect, characterized in that the automatic mask deciding device decides whether or not each of face images is to be masked based on a largeness, the number, a position in an image angle, or a direction of a face of each of face images detected by the face image detecting device.

The seventh aspect is accomplished by adding the same feature as that of the fourth aspect to the invention according to the third aspect.

An image processing apparatus according to an eighth aspect of the present invention is, in the invention according to the third aspect, characterized in that the automatic mask deciding device decides whether or not an image to be decided is to be masked depending on whether or not a face image of the same person whose face image is the same as each of face images detected by the face image detecting device appears in a prescribed number or more images of other already-recorded images.

The eighth aspect is accomplished by limiting the invention according to the third aspect with the same item as that of the fifth aspect.

An image processing apparatus according to a ninth aspect of the present invention is, in the invention according to the third aspect, characterized in that when an image inputted by the image inputting device is a moving image including a plurality of frame images, the automatic mask deciding device decides whether or not each frame image is to be masked depending on whether or not a face image of the same person detected by the face image detecting device appears in a prescribed number or more frame images.

The ninth aspect is accomplished by adding the same feature as that of the sixth aspect to the invention according to the third aspect.

An image processing apparatus according to a tenth aspect of the present invention is, in the invention according to any one of the second, third, and seventh to ninth aspects, characterized in that such a mode is provided that the operation screen is automatically displayed in which a user inputs the decision whether or not each of face images detected by the face image detecting device is masked with the displaying device when an image is inputted by the image inputting device.

According to the tenth aspect, when an image is inputted in a prescribed mode, the operation screen is automatically displayed in which a user inputs the decision whether or not each of face images is to be masked before the image is transmitted. Thereby, when an image is inputted, in consideration of transmitting the image, the privacy is guarded, and a GUI is simplified by providing a transmission-preceding GUI.

In the invention according to the second, third, and seventh to ninth aspects, an image processing apparatus according to an eleventh aspect of the present invention, is provided with such a mode that the operation screen is displayed in which a user inputs the decision whether or not each of face images detected by the face image detecting device is to be masked with the displaying device when an operation is executed which instructs that an image is transferred by the transferring device.

In the eleventh aspect, when the transmission of an image is instructed in a prescribed mode, the operation screen is automatically displayed in which a user inputs the decision whether or not each of face images is masked before the image is transmitted. Thereby, the privacy is securely guarded when the image is transmitted, and a GUI is simplified by providing a transmission-preceding GUI.

An image processing apparatus according to a twelfth aspect of the present invention is, in the invention according to any one of the second, third, and seventh to eleventh aspects, characterized in that when an image inputted by the image inputting device is a moving image including a plurality of frame images, the displaying device sequentially displays the operation screen for the frame images, in which a face image of a new person appears, which is detected by the face image detecting device.

The twelfth aspect illustrates such an embodiment that the operation screen is displayed in which a user inputs the decision whether or not each of face images is masked when a moving image is transmitted.

An image processing apparatus according to a thirteenth aspect of the present invention is, in the invention according to the twelfth aspect, characterized in that the displaying device displays a face image of a person who newly appears as the operation screen with the largeness or the density depending on the number of frame images in which the person appears.

According to the thirteenth aspect, the operation screen is more easily viewed in which a user inputs the decision whether or not each of face images is masked.

An image processing apparatus according to a fourteenth aspect of the present invention is, in an image processing apparatus according to any one of the second, third, and seventh to thirteenth aspects, characterized in that the displaying device list-displays face images detected by the face image detecting device as the operation screen.

According to the fourteenth aspect, the operation screen is more easily viewed in which a user inputs the decision whether or not each of face images is masked.

An image processing apparatus according to a fifteenth aspect of the present invention is, in the invention according to any one of the second, third, and seventh to fourteenth aspects, characterized in that when an image inputted by the image inputting device is a moving image including a plurality of frame images, the displaying device displays each of face images detected by the face image detecting device as the operation screen with the number of frame images in which a face image of the same person appears.

According to the fifteenth aspect, the operation screen is more easily viewed in which a user inputs the decision whether or not each of face images is masked.

An image processing apparatus according to a sixteenth aspect of the present invention is, in the invention according to the fourteenth aspect, characterized in that when an image inputted by the image inputting device is a moving image including a plurality of frame images, the displaying device displays an face image which is mostly full-faced of face images of the same person detected by the face image detecting device as the operation screen.

According to the sixteenth aspect, the operation screen is more easily viewed in which a user inputs the decision whether or not each of face images is masked.

An image processing apparatus according to a seventeenth aspect of the present invention is, in the invention according to the fourteenth aspect, characterized in that when an image inputted by the image inputting device is a moving image including a plurality of frame images, the displaying device displays an face image whose area is the largest of each of face images of the same person detected by the face image detecting device as the operation screen.

According to the seventeenth aspect, the operation screen is more easily viewed in which a user inputs the decision whether or not each of face images is masked.

An image processing apparatus according to an eighteenth aspect of the present invention is, in the invention according to any one of the first to seventeenth aspects, characterized in that an image which is inputted by the image inputting device and is not masked is stored in a storing memory.

The eighteenth aspect illustrates an aspect for storing an original image.

According to the image processing apparatus of the present invention, when an image (a still image and a moving image) photographed by a camera is transferred to an external device, a face of a person whose personal privacy is guarded becomes to be able to be securely masked with an easy user operation.

BRIEF DESCRIPTION OF THE DRAWINGS

FIG. 24 is a diagram illustrating an example of a mask area in the whole image angle area of a photographed image to be transmitted.

DETAILED DESCRIPTION OF THE PREFERRED EMBODIMENTS

The preferred embodiments for implementing an image processing apparatus according to the present invention will be described in detail below depending on the attached drawings.

Figure 1:
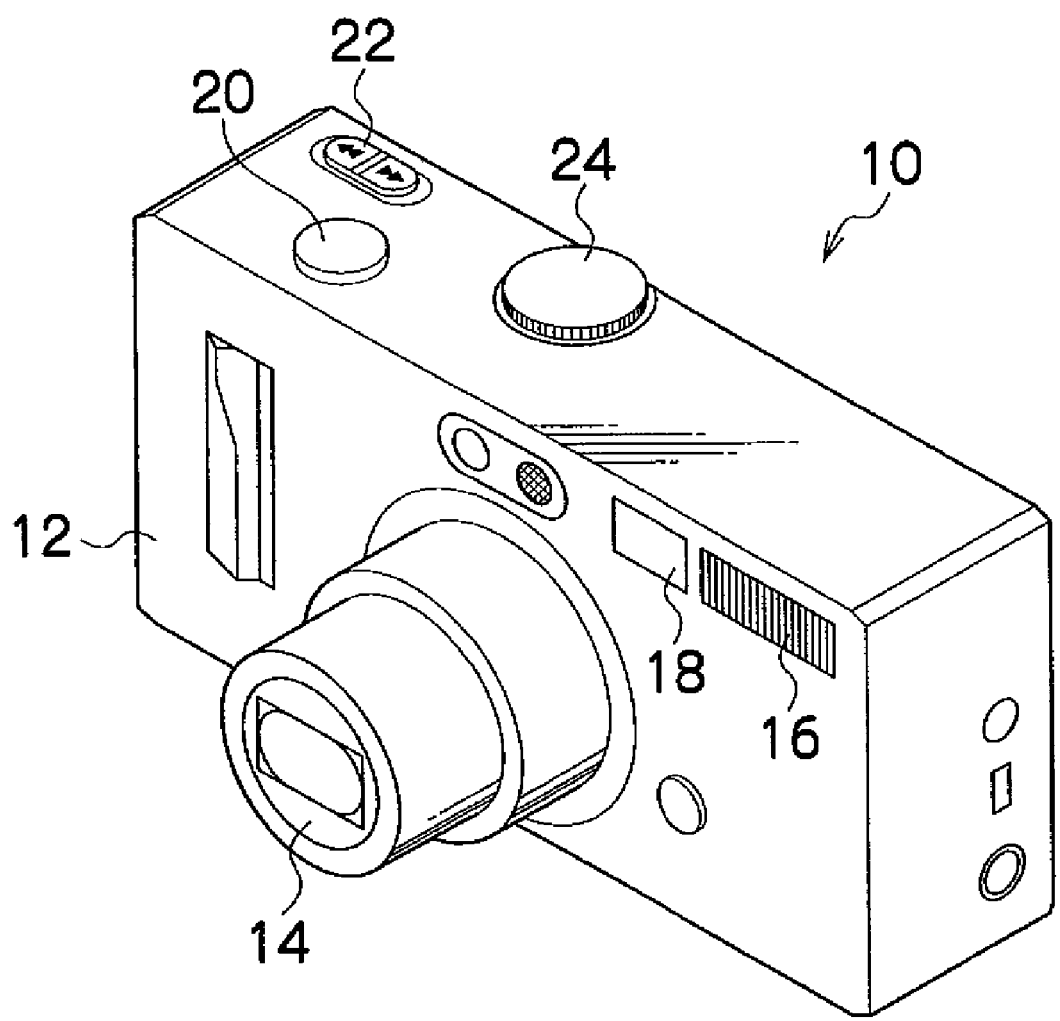
FIG. 1 is a front perspective view of a digital camera to which the present invention is applied.
Figure 2:
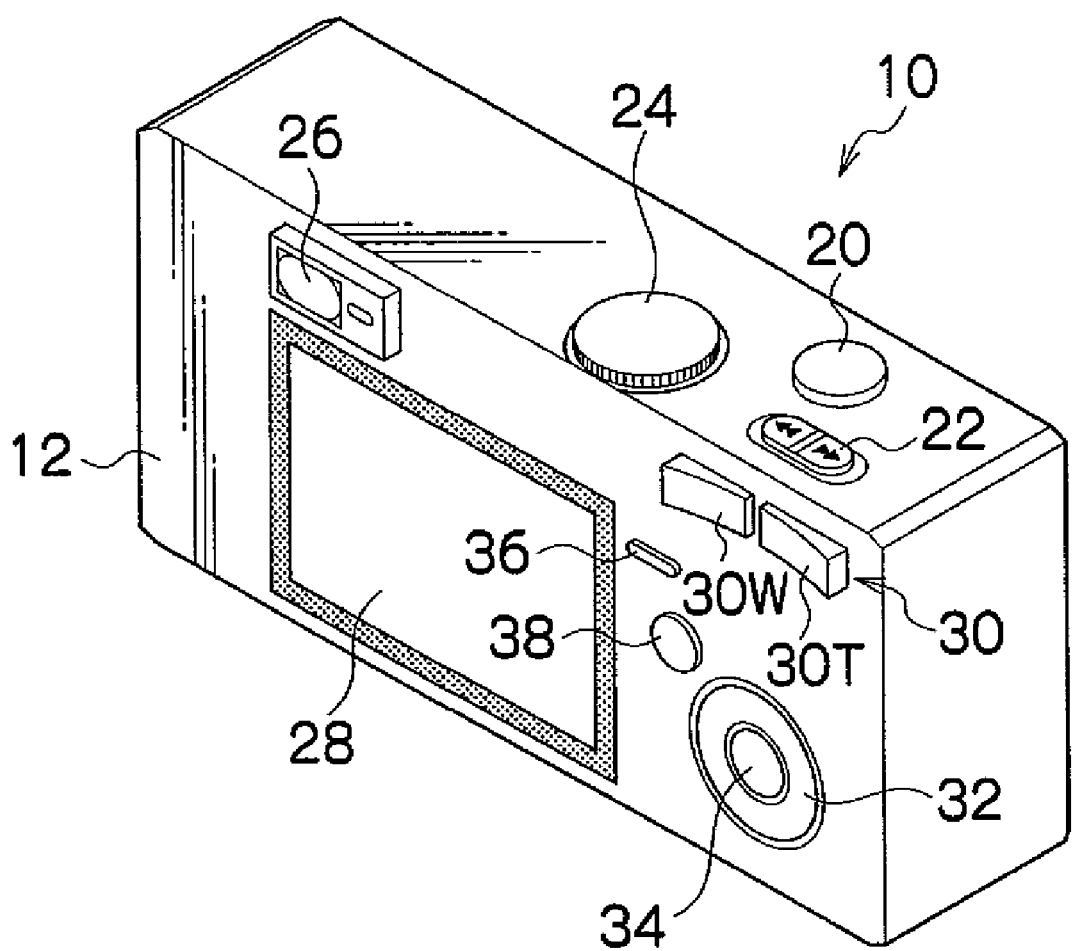
FIG. 2 is a back perspective view of the digital camera to which the present invention is applied.

FIG. 1 and FIG. 2 are a front perspective view and a back perspective view of a digital camera to which the present invention is applied respectively. As illustrated in FIG. 1 and FIG. 2, on a front side of a camera body 12 of a digital camera 10 (hereinafter, referred to as a camera 10), a photographing lens 14, a flash 16, a finder window 18, and the like are provided. On an upper side of the camera body 12, a shutter button 20, a power/mode switch 22, a mode dial 24, and the like are provided, and on a back side, a finder eye piece 26, a liquid crystal monitor 28, a zoom button 30, a cross button 32, a MENU/OK button 34, a DISP button 36, a BACK button 38, and the like are provided. In a not-illustrated bottom side of the camera body 12, a battery storing room for storing batteries, and a card slot for loading a memory card as a storing memory are provided through an openable and closable cover.

The photographing lens 14 is configured with, for example, a collapsible zoom lens, and in a photographing mode, when the power of the digital camera 10 is turned on, is expanded from the camera body 12, and when the power is turned off, is collapsed.

The flash 16 is an apparatus illuminating auxiliary light to an object under a low illuminance, and is allocated above the photographing lens 14.

The shutter button 20 is configured with a two-stage stroke type switch including so-called "half-stroke" and "full-stroke". In the digital camera 10, when the shutter button 20 is half-stroked, AE (Automatic Exposure), AF (Auto Focus) and AWB (Auto White Balance) function, and when the shutter button 20 is full-stroked, the photographing is executed.

The power/mode switch 22 includes a function as a power switch turning on/off the power of the digital camera 10 and a function as a mode switch setting a mode of the digital camera 10, and is provided so as to be able to slide among "OFF position", "reproducing position", and "photographing position". In the digital camera 10, the power is turned on by moving the power/mode switch 22 to "reproducing position", or "photographing position", and the power is turned off by moving the power/mode switch 22 to "OFF position". A "reproducing mode" is set by moving the power/mode switch 22 to "reproducing position", and a "photographing mode" is set by moving the power/mode switch 22 to "photographing position".

The mode dial 24 functions as a mode setting device which sets an operation mode of the digital camera 10, and the operation mode of the digital camera 10 is set to a mode depending on a set position of the mode dial 24. For example, the mode dial 24 is switched to a still image photographing mode for photographing a still image, a moving image photographing mode for photographing a moving image, a transmitting mode for transferring a photographed image to an external device through a communication line, and the like. Meanwhile, even in the still image photographing mode, a variety of different photographing modes can be set such as an auto photographing mode, a portrait photographing mode, and a night scene photographing mode.

The liquid crystal monitor 28 is configured with a liquid crystal display which can display a color image. The liquid crystal monitor 28 is utilized as an image displaying panel for displaying a photographed image in a reproducing mode, and is utilized as a user interface displaying panel in case of a variety of settings. A through image is displayed as needed in case of the photographing, and is utilized as an electronic finder for confirming an image angle.

The zoom button 30 is configured with a zoom tele button 30T for instructing the zooming to a tele side, and a zoom wide button 30W for instructing the zooming to a wide-angle side, and the photographing image angle is changed by operating the zoom button 30.

The cross button 32 can be pushed and operated in four directions, up, down, left, and right, and functions as a button for inputting an instruction for each direction.

The MENU/OK button 34 functions as a button (MENU button) for instructing the moving from a normal screen of each mode to a menu screen, and functions as a button (OK button) for instructing to fix selected content and execute the processing and the like.

The DISP button 36 functions as a button for instructing to switch displayed content of a back display panel, and the BACK button 38 functions as a button for instructing to cancel an inputting operation, and the like.

Figure 3:
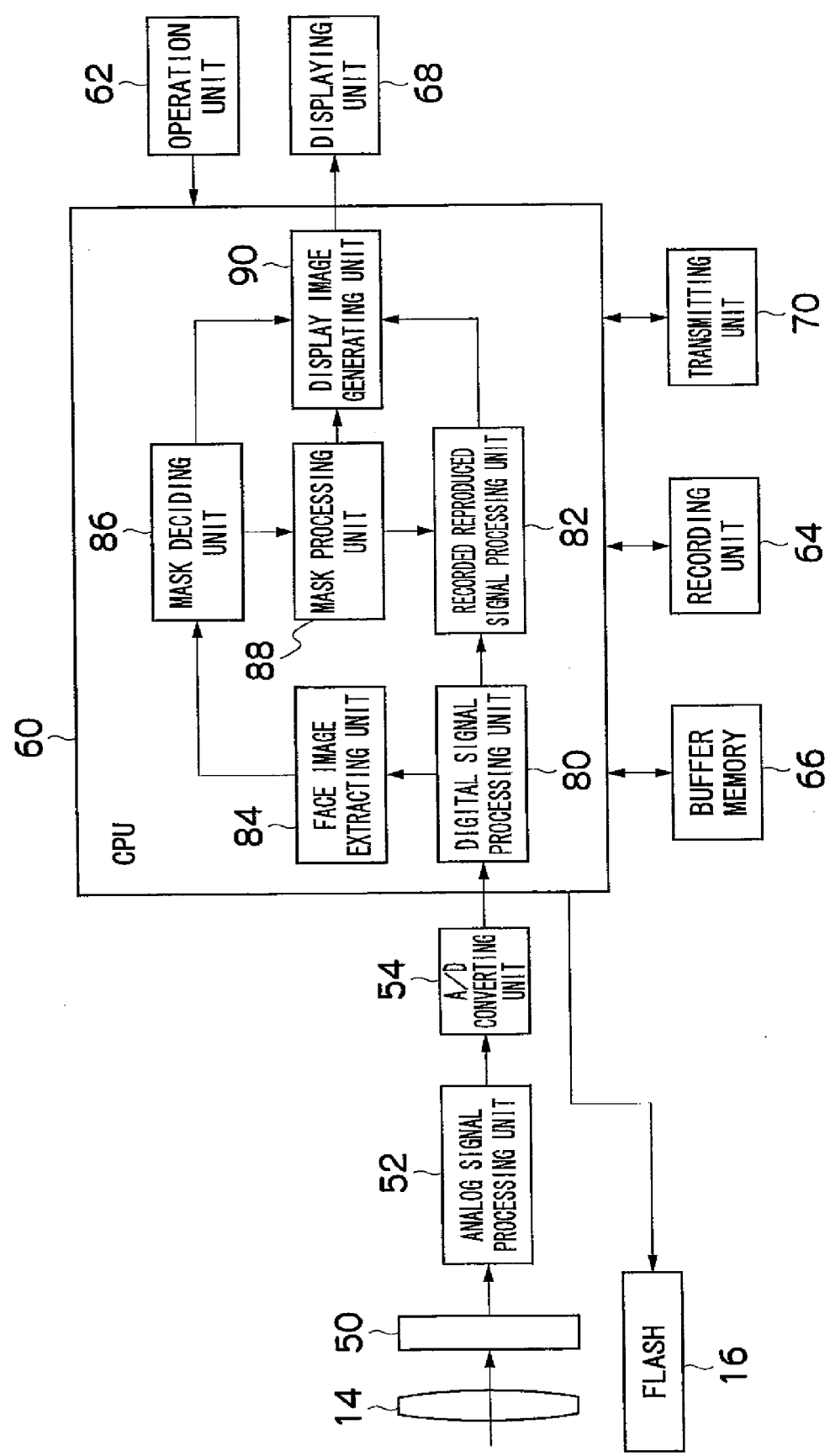
FIG. 3 is a block diagram illustrating an internal configuration of the camera of FIG. 1.

FIG. 3 is a block diagram illustrating an internal configuration of the camera 10. The camera 10 of FIG. 3 includes a configuration which is similar to that of a general digital camera, and is provided with the photographing lens 14, an imaging element 50, an analog signal processing unit 52, an A/D converting unit 54, a CPU 60, an operation unit 62, a recording unit 64, a displaying unit 68, a transmitting unit 70, and the like.

First, a configuration unit for inputting an image will be described, and the photographing lens 14 is an optical system for focusing an image of an object, and focuses light inputted from the object on an imaging surface (an acceptance surface) of the imaging element 50 as an object image. Meanwhile, the flash 16 emits light as needed with the controlling of the CPU 60, and illuminates illuminating light to the object. While omitted in FIG. 3, the photographing lens 14 is provided with a focus lens for adjusting a focus, a zoom lens (variable magnification lens) for adjusting a focus distance (adjusting a photographing magnification), an aperture for adjusting an amount of light, and the like, and such units are driven by not-illustrated motors depending on an instruction of the CPU 60. The CPU 60 controls the focus lens, the zoom lens, and the aperture by driving such motors depending on operation signals provided from the operation unit 62. The operation unit 62 is illustrated as a block including a variety of operation units provided on the camera body 12, and an operation detecting circuit outputting operation signals indicating operation content of such operation units. For example, when the operation signal indicating that the shutter button 20 is half-stroked is provided from the operation unit 62, the CPU 60 moves the focus lens to a position at which an image is focused by an automatic focus processing whose detail is omitted. When the zoom button 30 illustrated in FIGS. 1 and 2 is operated, and an operation signal indicating the operation content is provided from the operation unit 62, the CPU 60 moves the zoom lens depending on the operation signal.

The imaging element 50 is a solid state imaging element such as a CCD, and the like, and converts an object image focused on an imaging surface by the photographing lens 14 to an electrical signal with the photo-electrical conversion to output an image signal indicating the object image.

The analog signal processing unit 52 inputs the image signal outputted from the imaging element 50, and executes a required analog signal processing for the inputted image signal. For example, a processing such as a correlative double sampling and a gain adjusting is applied to the image signal by the analog signal processing unit 52. The image signal to which the required processing is applied by the analog signal processing unit 52 is outputted, is converted to a digital signal by the A/D converting unit 54, and is inputted as image data to the CPU 60.

The CPU 60 is a calculating unit totally controlling the whole of camera, and controls each operation of the camera 10. A plurality of processing units are illustrated in a block of the CPU 60 of FIG. 3, and a variety of processing operations for an image processing executed in the CPU 60 are separately executed in a plurality of processing units. As described above, a required digital signal processing is applied to image data inputted from the A/D converting unit 54 to the CPU 60 by a digital signal processing unit 80. For example, a tone conversion, a white balance correction, a γ correction, and the like are applied by the digital signal processing unit 80.

An image is inputted, which is appropriately processed by the above-described components. Meanwhile, when a moving image is inputted, an image is continuously inputted as described above, and each image is included as a frame image in the moving image.

The camera 10 of FIG. 3 is provided with components for recording, displaying, or transmitting an image (including a moving image), and the like.

The recording unit 64 is a processing unit for writing or reading data such as image data in a memory card loaded in the camera 10 as a storing memory, or a memory incorporated in the camera 10 as a storing memory. For example, when an image inputted as described above by full-stroking the shutter button 20 in a photographing mode (a still image photographing mode and a moving image photographing mode), an image masked as described later, and the like are recorded in the storing memory, such data is format-converted (compressing, etc.) to data to be recorded by a recorded reproduced signal processing unit 82 of the CPU 60, and the format-converted data is transferred from the CPU 60 to the recording unit 64. The recording unit 64 writes and stores the data provided from the CPU 60 in the storing memory. Meanwhile, a buffer memory 66 of FIG. 3 is used to temporarily store image data to be processed in the CPU 60, and the like.

The displaying unit 68 executes the processing to display an image, and the like in the liquid crystal monitor 28 of the camera 10. For example, when an image is displayed as a through image in the liquid crystal monitor 28, the image being inputted while the shutter button 20 is not fill-stroked in a photographing mode (a still image photographing mode and a moving image photographing mode), when an image recorded in the storing memory is read to be displayed in the liquid crystal monitor 28 in a reproducing mode, or when an operation and confirming screen for the masking is displayed as described later, an image to be displayed, which is provided from the CPU 60, is displayed in the liquid crystal monitor 28. The image to be displayed in the liquid crystal monitor 28 is generated by a display image generating unit 90 of the CPU 60, and the image signal is transferred to the displaying unit 68. Meanwhile, when an image recorded in the storing memory is displayed in the liquid crystal monitor 28, the image data is read from the storing memory by the recording unit 64. The read image data is format-converted (expanded, etc.) to data to be displayed by the recorded reproduced signal processing unit 82 of the CPU 60, and an image signal of an image to be displayed is generated by a display image generating unit 90.

The transmitting unit 70 is provided with a communicating device for connecting to a base station such as a portable telephone and a wireless LAN with a wireless communication. As the transmitting unit 70 and the base station are connected with a wireless communication, it is possible to communicate with other device through a communication line such as a portable telephone line and the Internet. The data such as the image inputted as described above, and the image recorded in the storing memory can be transmitted to an external device with such a communicating function, and when data to be transmitted to the external device is provided from the CPU 60 to the transmitting unit 70, the data is transferred from the transmitting unit 70 to the communication line. Meanwhile, the present invention can be applied to not only such a case that the camera 10 and the base station are connected by wireless, but also such a case that the camera 10 is connected to the communication line by wire, and can be also applied to such a case that the camera 10 and the external device are directly connected by wire or by wireless without using the communication line such as a portable telephone line and the Internet.

When transmitting an image to an external device, the camera 10 is provided with a privacy guarding function for guarding the privacy of an unspecified person by masking a face of the unspecified person which does not intend to be photographed in an image. The CPU 60 is provided with a face image extracting unit 84, a mask deciding unit 86, and a mask processing unit 88 for processing an image with the privacy guarding function.

The face image extracting unit 84 extracts (detects) a face image from an image (photographed image) which is inputted by the imaging element 50 as described above. For example, a flesh color part is extracted from tone colors of each pixel of the photographed image, and when an area of the flesh color part is equal to or larger than a previously-set threshold, the flesh color part is detected as a face of a person.

Alternatively, a face of a person is detected by extracting a specific part of a face such as an eye and a mouth with a well-known pattern recognition technology. Meanwhile, other method may be used as a method for detecting a face image.

The mask deciding unit 86 is a processing unit which automatically decides or decides based on a user operation whether or not each of face images extracted by the face image extracting unit 84 is masked (to be masked or not to be masked).

The mask processing unit 88 masks a face image which is decided to be masked by the mask deciding unit 86. For example, the face image is mosaicked as the masking. However, it is enough to obfuscate a face as the masking, so that a mask pattern other than a mosaic pattern may be applied. A user may select the mask pattern from a plurality of candidates.

The image masked by the mask processing unit 88 is format-converted to data to be recorded (transmitted) by the recorded reproduced signal processing unit 82, and is transferred from the CPU 60 to the transmitting unit 70 to be transferred to the external.

In the camera 10 as configured above, a privacy guarding function will be described in detail, which guards the privacy of an unspecified person in an image to be transmitted.

Figure 4:
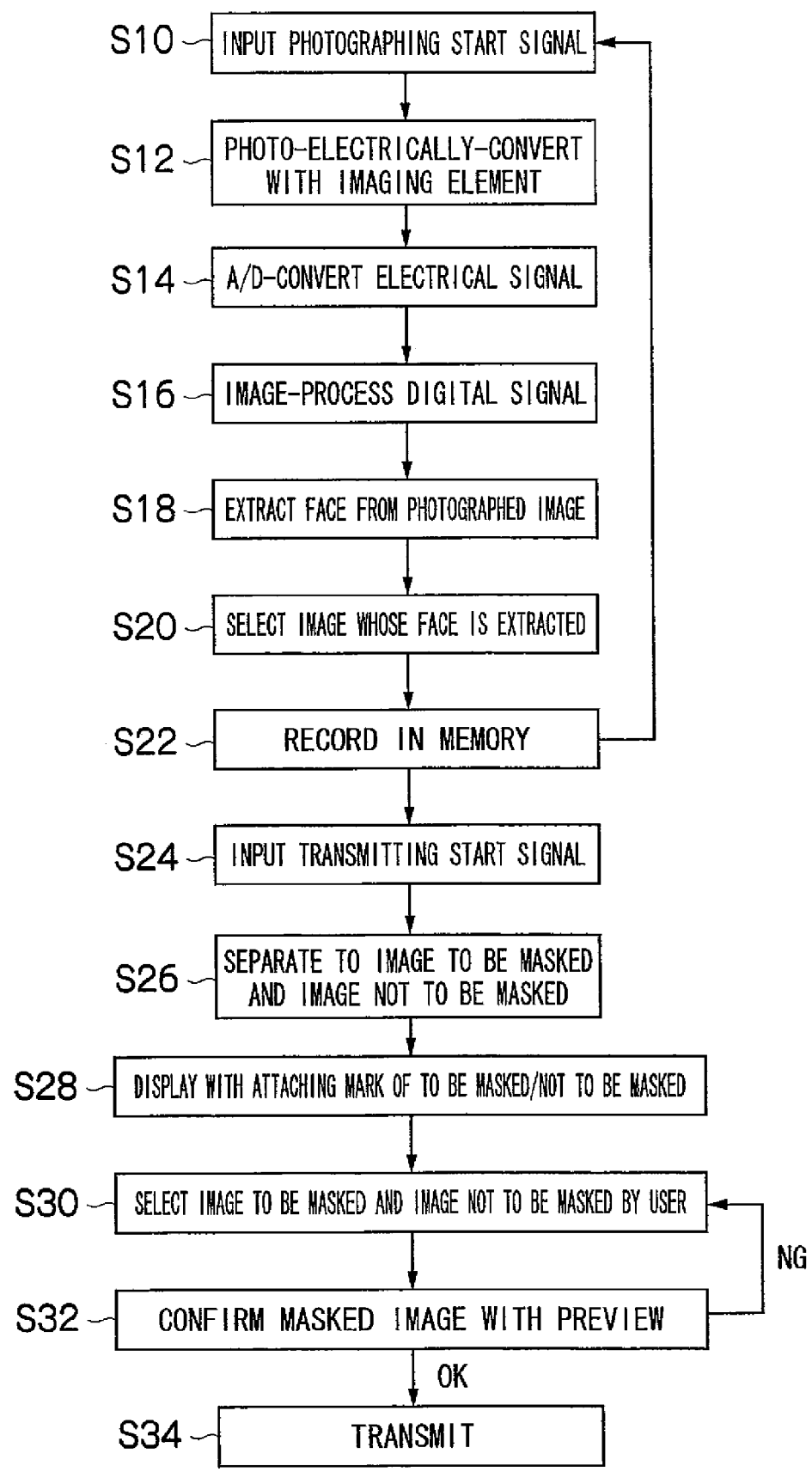
FIG. 4 is a flowchart illustrating a basic procedure regarding a privacy guarding function in case that an image is transmitted.

FIG. 4 is a flowchart illustrating a basic procedure regarding a privacy guarding function in case that an image is transmitted by the camera 10.

First, when the shutter button 10 is full-stroked, and a photographing start signal is provided from the operation unit 62 to the CPU 60 (step S10). An object image focused by the photographing lens 14 is photo-electrically converted as an object image to be recorded by the imaging element 50 (step S12). When an image signal of the obtained object image is outputted from the imaging element 50, after a required analog signal processing is applied to the image signal by the analog signal processing unit 52, the image signal is converted to a digital signal by the A/D converting unit 54 (step S14). The image signal converted to a digital signal is inputted as image data in the CPU 60, and a required digital signal processing is applied to the image signal by the CPU 60 (the digital signal processing unit 80 of the CPU 60) (step S16). An appropriately-processed image is inputted with the above processing of step S10 to step S16.

Next, the CPU 60 (the face image extracting unit 84 of the CPU 60) extracts (detects) an image (face image) of a face of a person from an image (photographed image) inputted by the imaging element 50 as described above (step S18). Subsequently, the photographed image in which a face image is extracted is selected as a photographed image to be processed (masked) by an after-mentioned privacy guarding function (step S20). The photographed image and information regarding the extracted face image, and the like are recorded in the buffer memory 66 (step S22), and it returns to step S10.

Meanwhile, when a moving image is photographed in a moving image photographing mode, the above processing of step S10 to step S22 is repeatedly executed until a prescribed photographing stop signal is inputted from the operation unit 62 to the CPU 60, and a frame image of a moving image is configured with each image sequentially inputted during the repeated execution.

On the other hand, when a transmission start signal instructing for transmitting an image is inputted from the operation unit 62 to the CPU 60 by a prescribed operation of a user (step S24), the processing of a privacy guarding function starting from next step S26 is executed for each photographed image selected as an image to be masked at step S20. Meanwhile, it may move to the processing starting from step S26 by the prescribed operation of a user, and when a free capacity of the buffer memory 66 becomes equal to or less than a prescribed quantity, or when the number of frames of the inputted photographed image becomes a prescribed number, it may automatically move to the following processing starting from step S20.

First, the CPU 60 (the mask deciding unit 86 of the CPU 60) executes the automatic mask deciding for selecting whether each of face images extracted from the photographed image is masked or not that is, is to be masked or is not to be masked (step S26). An actual aspect of the automatic mask deciding will be described later. It may move to next processing without executing the automatic mask deciding.

Subsequently, the CPU 60 (the display image generating unit 90 of the CPU 60) generates an image for mask decision, the image obtained by attaching a mark for identifying an image to be masked and an image not to be masked to each of face images of the photographed image, and outputs the image signal to the displaying unit 68 to cause the liquid crystal monitor 28 to display a mask decision screen (step S28).

Figure 5:
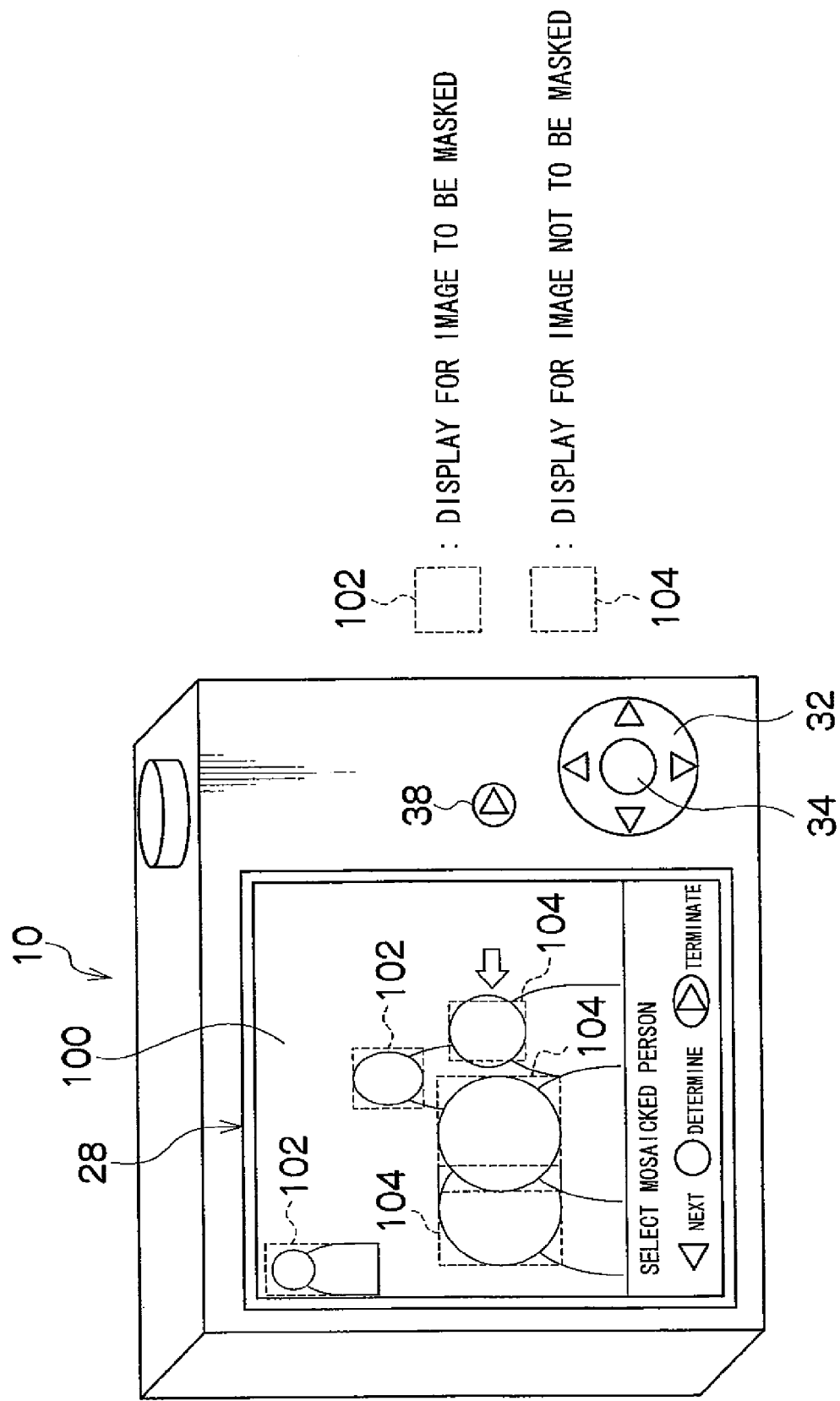
FIG. 5 is a diagram exemplifying a mask decision screen in case that a user selects to be masked/not to be masked in FIG. 4.

FIG. 5 is a diagram exemplifying an aspect of the mask decision screen. In FIG. 5, a photographed image to be transmitted is displayed as a mask decision screen 100 of the liquid crystal monitor 28 of the camera 10, and operation guidance information is displayed under the screen. In the photographed image, a mask area (square area including a face image) of a face image selected as an image to be masked by the automatic mask deciding is displayed with a green dash line frame 102, and a mask area of a face image selected as an image not to be masked is displayed with a red dash line frame 104. Meanwhile, a face image to be masked and a face image not to be masked are not identified with colors, but may be identified with characters, codes, or figures, and may be identified with a kind of a frame line indicating an area of a face image, and the like.

In the mask decision screen 100, a user confirms a face image currently selected as an image to be masked and a face image currently selected as an image not to be masked, and decides whether or not the selection is appropriate. If the selection is not appropriate, the user manually selects (manual mask deciding operation) an image to be masked and an image not to be masked for each of face images. In the mask decision screen 100 of FIG. 5, for example, a face image of a person which is needed to be masked (mosaicked) is designated to be selected (e.g. dash line blinks on and off) by operating the cross button 32 depending on the guidance information under the mask decision screen 100, and face image is determined to be masked by pushing the MENU/OK button 34. This operation is not applied to a face image which is needed not to be masked. The selection whether each of face images is to be masked or not to be masked is executed by repeating such an operation (step S30). When the selecting operation is terminated, for example, the above manual mask deciding operation is terminated by pushing the BACK button 38.

The CPU 60 (the mask deciding unit 86 of the CPU 60) detects the above user operation with the operation signal from the operation unit 62, and sets each of face images to be masked or not to be masked depending on the user operation. Meanwhile, when the result of the automatic mask deciding is appropriate, and when a user terminates a manual mask deciding operation without changing the selection whether every face image is to be masked or not to be masked, the result of the automatic mask deciding is directly adopted.

When the manual mask deciding operation is terminated, subsequently, the CPU 60 (the mask processing unit 88 of the CPU 60) masks a face image selected as an image to be masked of the photographed image. The CPU 60 (the display image generating unit 90 of the CPU 60) outputs an image signal of the masked photographed image to the displaying unit 68, and causes the liquid crystal monitor 28 to preview-display the photographed image (step S32).

A user confirms the masked photographed image with the preview-displaying, and if the user confirms that the photographed image is not appropriately masked, the user executes a reselecting operation. Thereby, it returns to a manual mask deciding operation at step S30.

On the other hand, in the preview-displaying of step S32, when the user executes a prescribed operation indicating that it is confirmed that the photographed image is appropriately masked, the CPU 60 (the recorded reproduced signal processing unit 82 of the CPU 60) converts the masked photographed image to data to be recorded (transmitted), and transfers the data to a communication line through the transmitting unit 70 (step S34).

Meanwhile, in the above processing of the flowchart, while the preview-displaying is executed at step S32, the transmitting at step S34 may be executed without executing the preview-displaying.

In the above processing, after the CPU 60 automatically decides whether each detected face image is to be masked or not to be masked (after the automatic mask deciding), when the result is not appropriate, the user decides (the manual mask deciding operation), however, in such a case, in the result of the automatic mask deciding, the decision whether the face image is to be masked or not to be masked may be corrected by the manual mask deciding operation only for the face image whose decision is not appropriate. Without executing both of the automatic mask deciding and the manual mask deciding operation, it may be selected only with either one whether each of face images is to be masked or not to be masked.

While the above processing is the processing for a still image photographed in a still image photographing mode, the masking for guarding the privacy can be also applied to a moving image to be transmitted by applying the above processing to each frame image included in the moving image for the moving image photographed in a moving image photographing mode.

Figure 6:
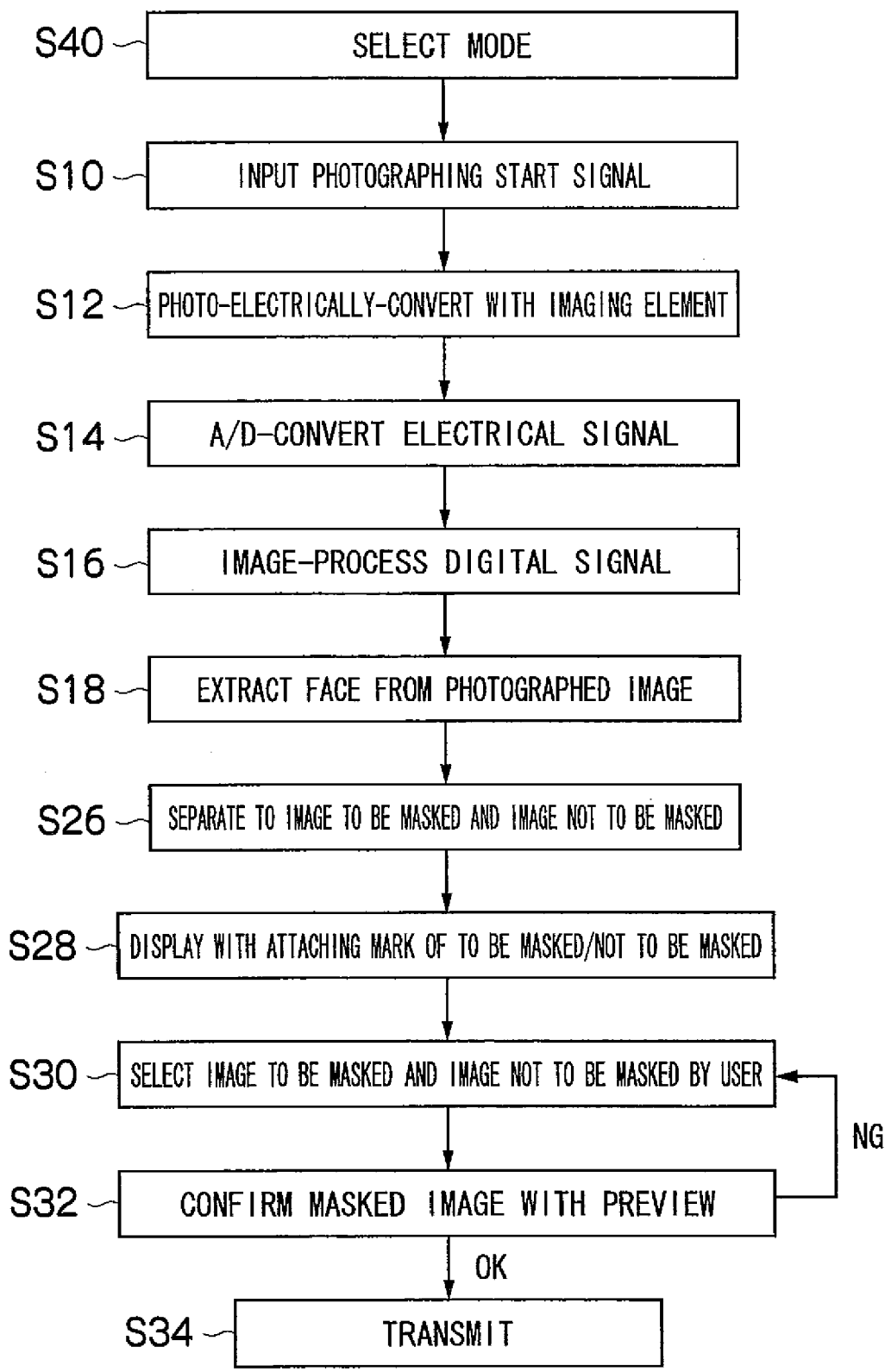
FIG. 6 is a flowchart illustrating an aspect of a procedure regarding the privacy guarding function in case that an image is transmitted.

FIG. 6 is a flowchart illustrating an aspect of a procedure regarding the privacy guarding function in case that an image is transmitted by the camera 10. Meanwhile, the same step number as that of FIG. 4 is attached to the processing which is the same as or similar to that of the flowchart illustrated in FIG. 4.

First, for example, when a user operates the mode dial 24 of FIG. 1 to select a prescribed mode (e.g. referred to as a transmission mode), and the CPU 60 detects that it is set to a transmission mode with an operation signal from the operation unit 62 (step S40), the following processing is executed.

After the transmission mode is selected, when the shutter button 20 is full-stroked, and the photographing start signal is provided from the operation unit 62 to the CPU 60 (step S10), an object image focused by the photographing lens 14 is photo-electrically converted as an object image to be recorded by the imaging element 50 (step S12). When an image signal of the obtained object image is outputted from the imaging element 50, after a required analog signal processing is applied to the image signal by the analog signal processing unit 52, the image signal is converted to a digital signal by the AD converting unit 54 (step S14). The image signal converted to a digital signal is inputted as image data in the CPU 60, and a required digital signal processing is applied to the image signal by the CPU 60 (the digital signal processing unit 80 of the CPU 60) (step S16). An appropriately-processed image is inputted with the above processing of step S10 to step S16.

Thereby, when one frame of photographed image (in case of photographing a moving image, a series of moving images including a plurality of frame images) is inputted from the imaging element 50, it automatically moves to the processing starting from next step S18. First, the CPU 60 (the face image extracting unit 84 of the CPU 60) extracts (detects) a face image of a person from the photographed image (step S18). The CPU 60 (the mask deciding unit 86 of the CPU 60) executes the automatic mask deciding for selecting whether each of face images extracted from the photographed image is to be masked or not to be masked (step S26).

Subsequently, the CPU 60 (the display image generating unit 90 of the CPU 60) generates an image for mask decision, the image obtained by attaching a mark for identifying an image to be masked and an image not to be masked to each of face images of the photographed image as the mask decision screen 100 illustrated in FIG. 5, and outputs the image signal to the displaying unit 68 to cause the liquid crystal monitor 28 to display a mask decision screen (step S28).

Next, as described above, and as needed, a user executes a manual mask deciding operation in the mask decision screen, and selects whether each of face images is to be masked or not to be masked (step S30). When the selecting operation is terminated, the above manual mask deciding operation is terminated with a prescribed operation (e.g. pushing the BACK button 38).

The CPU 60 (the mask deciding unit 86 of the CPU 60) detects a user operation with an operation signal from the operation unit 62, and sets each of face images to any one of an image to be masked and an image not to be masked depending on the user operation. Meanwhile, when the result of the automatic mask deciding is appropriate, and when the user does not change the selection whether any face image is to be masked or not to be masked, and terminates the manual mask deciding operation, the result of the automatic mask deciding is directly adopted.

When the manual mask deciding operation is terminated, subsequently, the CPU 60 (the mask processing unit 88 of the CPU 60) masks the face image selected as an image to be masked of the photographed image. The CPU 60 (the display image generating unit 90 of the CPU 60) outputs an image signal of the masked photographed image to the displaying unit 68, and causes the liquid crystal monitor 28 to preview-display the image (step S32).

The user confirms the masked photographed image with the preview-displaying, and if the user confirms that the image is not appropriately masked, the user operates the reselecting operation. Thereby, it returns to the processing of the manual mask deciding operation at step S30.

On the other hand, in the preview-displaying at step S32, when the user executes a prescribed operation indicating such a confirmation that the image is appropriately masked, the CPU (the recorded reproduced signal processing unit 82 of the CPU 60) converts the masked photographed image to data to be recorded (transmitted), and transfers the data to a communication line through the transmitting unit 70 (step S34).

Meanwhile, in the above processing of the flowchart, while the preview-displaying is executed at step S32, the data may be transmitted at step S34 without the preview-displaying.

In the above processing, after the CPU 60 automatically decides whether each detected face image is to be masked or not to be masked (after the automatic mask deciding), when the result is not appropriate, the user decides (the manual mask deciding operation), however, in such a case, in the result of the automatic mask deciding, the decision whether the face image is to be masked or not to be masked may be corrected by the manual mask deciding operation only for the face image whose decision is not appropriate. Without executing both of the automatic mask deciding and the manual mask deciding operation, it may be selected only with either one whether each of face images is to be masked or not to be masked.

A main procedure of the above processing can be also applied to a moving image photographed in a moving image photographing mode, and when one moving image is inputted (one time of photographing a moving image), it automatically moves to the processing for the privacy guarding (the automatic mask deciding and the processing of the manual mask deciding operation), and after that, a transmission mode for transmitting the moving image can be also provided in case of photographing a moving image.

Figure 7:
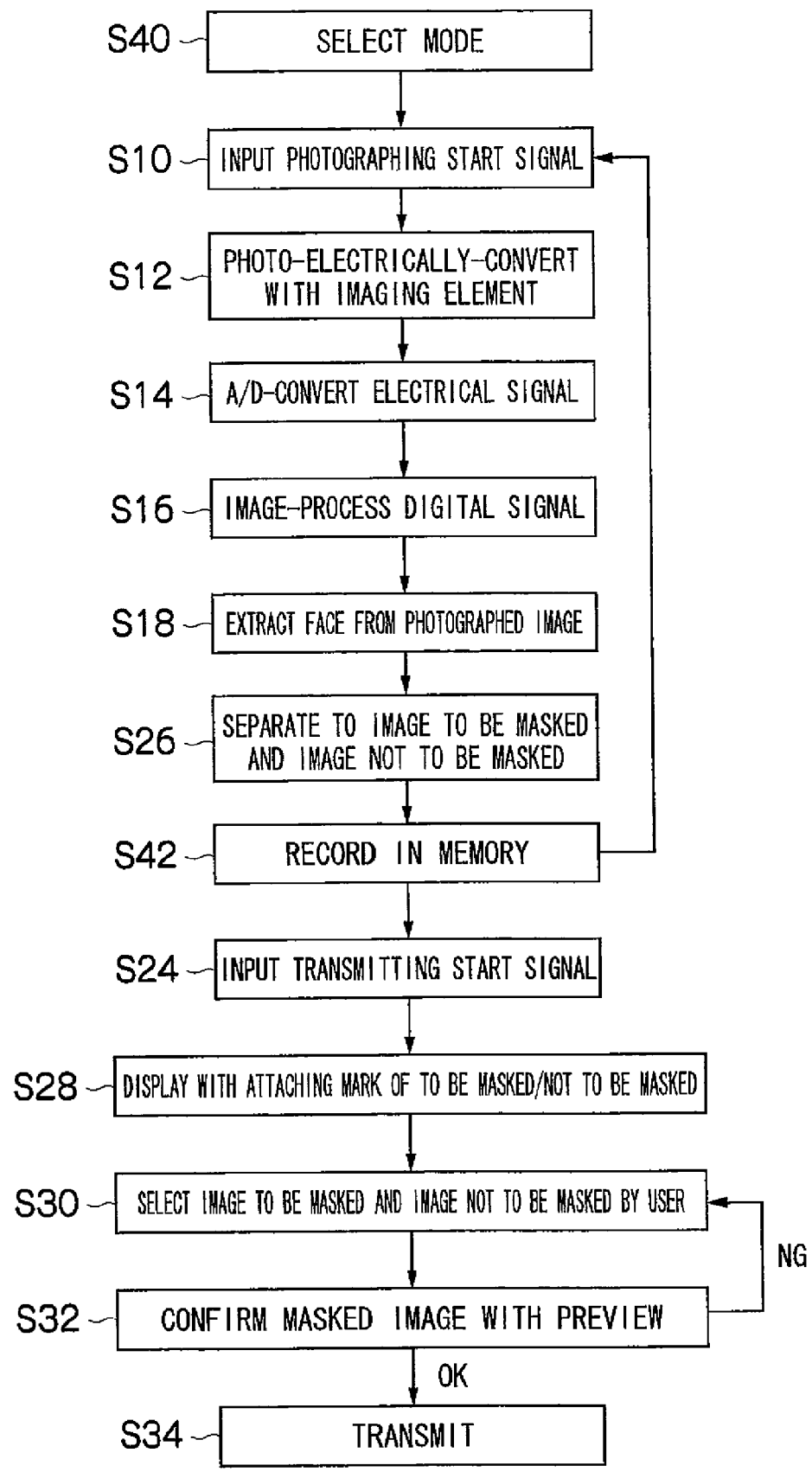
FIG. 7 is a flowchart illustrating an aspect of the procedure regarding the privacy guarding function in case that an image is transmitted.

FIG. 7 is a flowchart illustrating an aspect of a procedure regarding the privacy guarding function in case that an image is transmitted by the camera 10. Meanwhile, the same step number as that of FIG. 4 or FIG. 6 is attached to the processing which is the same as or similar to that of the flowchart illustrated in FIG. 4 or FIG. 6.

First, for example, when a user operates the mode dial 24 of FIG. 1 to select a prescribed mode (e.g. referred to as a transmission mode), and the CPU 60 detects that it is set to a transmission mode with an operation signal from the operation unit 62 (step S40), the following processing is executed.

After the transmission mode is selected, when the shutter button 20 is full-stroked, and the photographing start signal is provided from the operation unit 62 to the CPU 60 (step S10), an object image focused by the photographing lens 14 is photo-electrically converted as an object image to be recorded by the imaging element 50 (step S12). When an image signal of the obtained object image is outputted from the imaging element 50, after a required analog signal processing is applied to the image signal by the analog signal processing unit 52, the image signal is converted to a digital signal by the A/D converting unit 54 (step S14). The image signal converted to a digital signal is inputted as image data in the CPU 60, and a required digital signal processing is applied to the image signal by the CPU 60 (the digital signal processing unit 80 of the CPU 60) (step S16). An appropriately-processed image is inputted with the above processing of step S10 to step S16.

Thereby, when one frame of photographed image (in case of photographing a moving image, a series of moving images including a plurality of frame images) is inputted, it automatically moves to the processing starting from next step S18. First, the CPU 60 (the face image extracting unit 84 of the CPU 60) extracts (detects) a face image of a person from the photographed image (step S18). The CPU 60 (the mask deciding unit 86 of the CPU 60) executes the automatic mask deciding for selecting whether each of face images extracted from the photographed image is to be masked or not to be masked (step S26).

Subsequently, the photographed image, the result information of the automatic mask deciding, and the like are recorded in the buffer memory 66 (step S42), and it returns to step S10. Meanwhile, the photographed image, the result information, and the like may be also recorded in the storing memory instead of the buffer memory 66.

On the other hand, when a transmission start signal instructing for transmitting an image is inputted from the operation unit 62 to the CPU 60 by a prescribed operation of a user (step S24), the CPU (the display image generating unit 90 of the CPU 60) executes the following processing starting from step S28 for each photographed image recorded in the buffer memory 66.

First, the CPU 60 (the display image generating unit 90 of the CPU 60) generates an image for mask decision, the image obtained by attaching a mark for identifying an image to be masked and an image not to be masked to each of face images of the photographed image as the mask decision screen 100 illustrated in FIG. 5, and outputs the image signal to the displaying unit 68 to cause the liquid crystal monitor 28 to display a mask decision screen (step S28).

Next, as described above, and as needed, a user executes a manual mask deciding operation in the mask decision screen, and selects whether each of face images is to be masked or not to be masked (step S30). When the selecting is terminated, the above manual mask deciding operation is terminated with a prescribed operation (e.g. pushing the BACK button 38).

The CPU 60 (the mask deciding unit 86 of the CPU 60) detects a user operation with an operation signal from the operation unit 62, and sets each of face images to any one of an image to be masked and an image not to be masked depending on the user operation. Meanwhile, when the result of the automatic mask deciding is appropriate, and when the user does not change the selection whether any face image is to be masked or not to be masked, and terminates the manual mask deciding operation, the result of the automatic mask deciding is directly adopted.

When the manual mask deciding operation is terminated, subsequently, the CPU 60 (the mask processing unit 88 of the CPU 60) masks the face image selected as an image to be masked of the photographed image. The CPU 60 (the display image generating unit 90 of the CPU 60) outputs an image signal of the masked photographed image to the displaying unit 68, and causes the liquid crystal monitor 28 to preview-display the image (step S32).

The user confirms the masked photographed image with the preview-displaying, and if the user confirms that the image is not appropriately masked, the user operates the reselecting operation. Thereby, it returns to the processing of the manual mask deciding operation at step S30.

On the other hand, in the preview-displaying at step S32, when the user executes a prescribed operation indicating such a confirmation that the image is appropriately masked, the CPU (the recorded reproduced signal processing unit 82 of the CPU 60) converts the masked photographed image to data to be recorded (transmitted), and transfers the data to a communication line through the transmitting unit 70 (step S34).

Meanwhile, in the above processing of the flowchart, while the preview-displaying is executed at step S32, the data may be transmitted at step S34 without the preview-displaying.

In the above processing, after the CPU 60 automatically decides whether each detected face image is to be masked or not to be masked (after the automatic mask deciding), when the result is not appropriate, the user decides (the manual mask deciding operation). However, in such a case, in the result of the automatic mask deciding, the decision whether the face image is to be masked or not to be masked may be corrected by the manual mask deciding operation only for the face image whose decision is not appropriate. Without executing both of the automatic mask deciding and the manual mask deciding operation, it may be selected only with either one whether each of face images is to be masked or not to be masked.

A main procedure of the above processing can be also applied to a moving image photographed in a moving image photographing mode, and when it is instructed to transmit a moving image, such a procedure can be also applied to the case of transmitting the moving image that it automatically moves to the processing for the privacy guarding (the automatic mask deciding and the processing of the manual mask deciding operation) before the moving image is transmitted.

Figure 8:
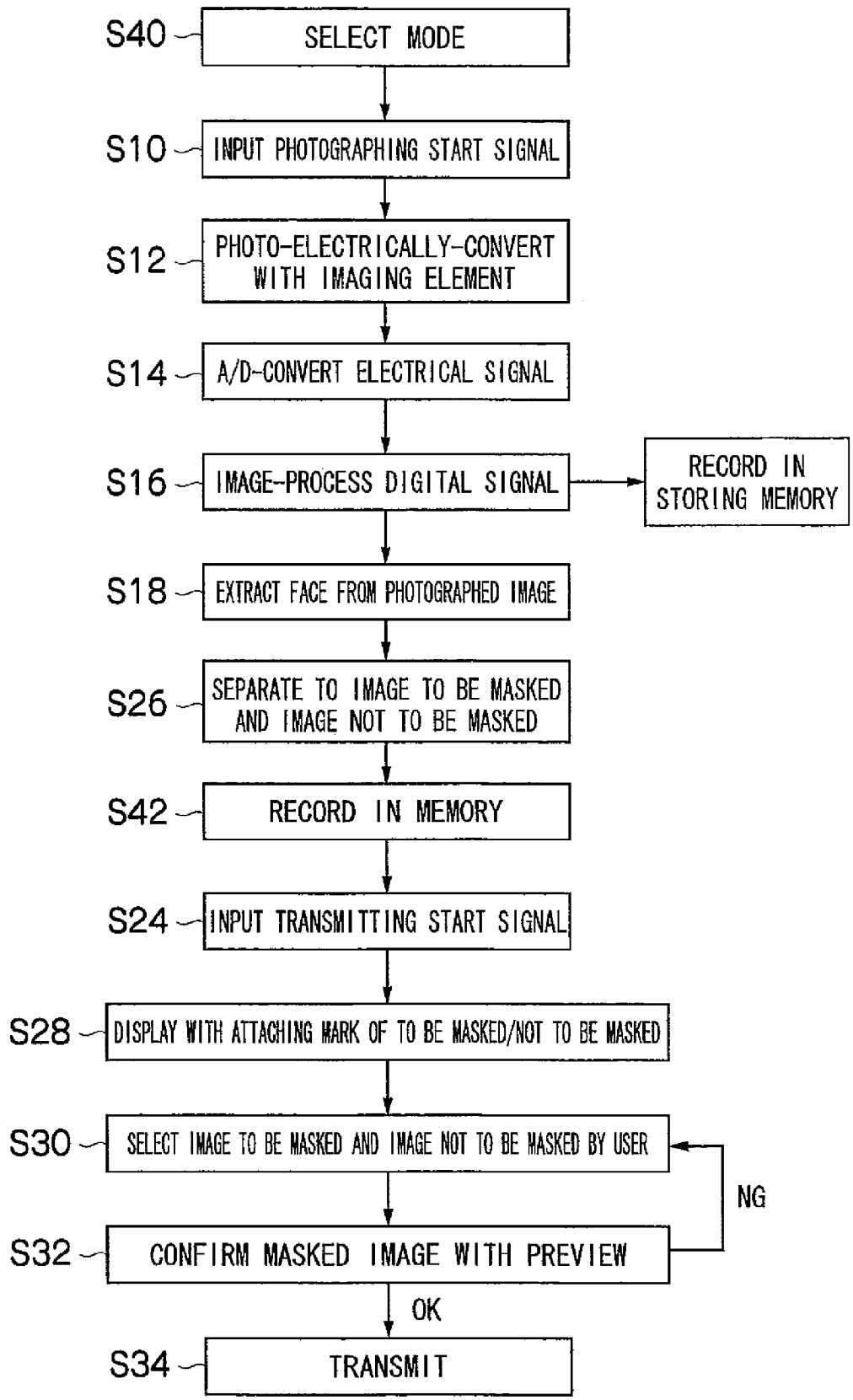
FIG. 8 is a flowchart illustrating an aspect of the procedure regarding the privacy guarding function in case that an image is transmitted.
Figure 9:
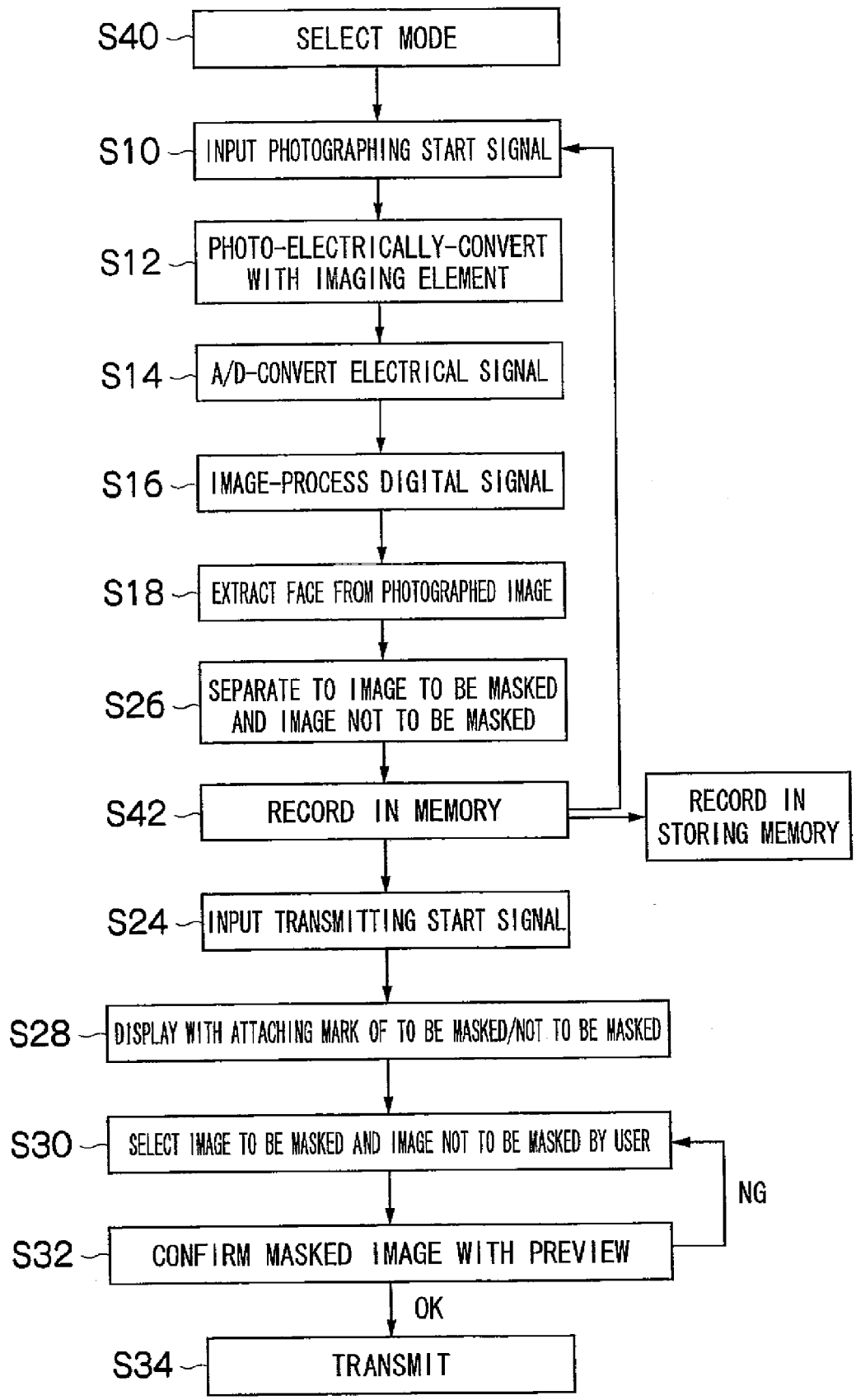
FIG. 9 is a flowchart illustrating an aspect of the procedure regarding the privacy guarding function in case that an image is transmitted.

FIG. 8 and FIG. 9 are flowcharts illustrating an aspect of a procedure regarding the privacy guarding function in case that an image is transmitted by the camera 10, and the procedures illustrated in FIG. 8 and FIG. 9 roughly correspond to the procedures of FIG. 6 and FIG. 7 respectively. The different point from the procedures of FIG. 6 and FIG. 7 is that in the processing of FIG. 8 and FIG. 9, the photographed image, to which the required digital signal processing is applied by the CPU 60 (the digital signal processing unit 80 of the CPU 60) at step S16 of FIG. 8, and at step S42 of FIG. 9, and which is inputted by the CPU 60, is recorded in a memory card loaded as a storing memory in the camera 10, or in a memory incorporated as a storing memory in the camera 10. Thereby, an original image before the masking can be recorded in the storing memory.

Figure 10:
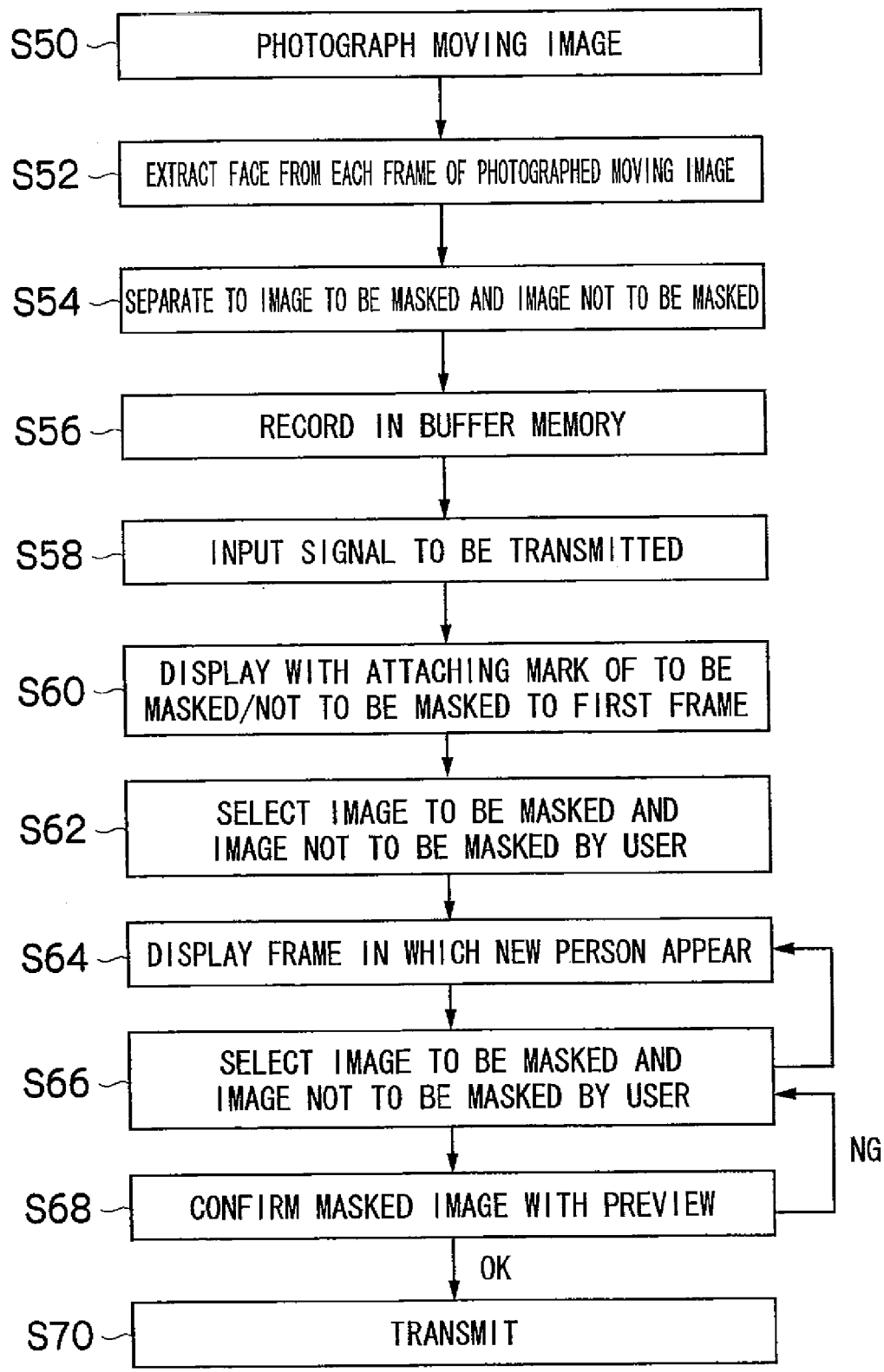
FIG. 10 is a flowchart illustrating a procedure regarding the privacy guarding function in case that a moving image is transmitted.

FIG. 10 is a flowchart illustrating the procedure regarding a privacy guarding function in case that an image is transmitted by the camera 10, particularly, is a flowchart illustrating a procedure in case that a moving image is transmitted.

While the detail will be omitted, in a moving image photographing mode, when the moving image photographing is started, the moving image is inputted, and it is terminated (step S50), the CPU 60 (the face image extracting unit 84 of the CPU 60) extracts (detects) a face image of a person from each frame (frame image) of the photographed moving image (step S52).

Next, the CPU 60 (the mask deciding unit 86 of the CPU 60) executes the automatic mask deciding for selecting whether each of face images extracted from each frame of the photographed moving image is to be masked or not to be masked (step S54). The result information of the automatic mask deciding, and the like are recorded in the buffer memory 66 (step S56).

Next, when a transmission start signal instructing to transmit a moving image is inputted from the operation unit 62 to the CPU 60 by a prescribed operation of a user (step S58), the following processing starting from step S60 is started.

First, the CPU 60 (the display image generating unit 90 of the CPU 60) generates an image for mask decision, the image obtained by attaching a mark for identifying an image to be masked and an image not to be masked to each of face images in the first frame image of the frame images whose face image is detected, and outputs the image signal to the to displaying unit 68 to cause the liquid crystal monitor 28 to display a mask decision screen (step S60).

Figure 11:
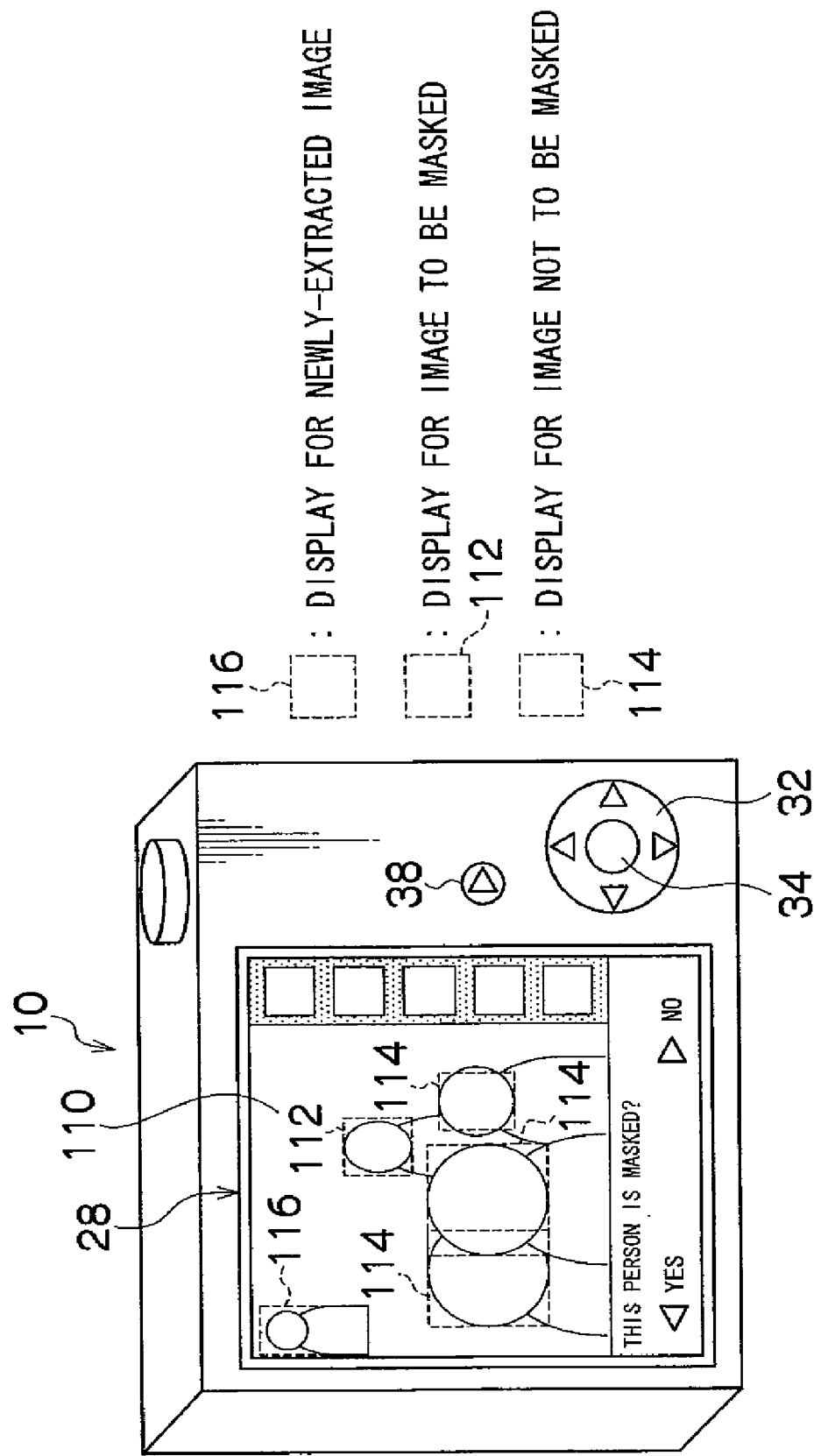
FIG. 11 is a diagram exemplifying a mask decision screen in case that a user selects to be masked/not to be masked in FIG. 10.

FIG. 11 is a diagram exemplifying an aspect of the mask decision screen. In FIG. 11, a frame image is displayed, and the operation guidance information is displayed as a mask decision screen 110 of the liquid crystal monitor 28. In the right side of the screen, a thumbnail image obtained by reducing or expanding each of face images extracted in a frame image to a prescribed size is displayed, and a face image which is currently being selected is displayed so as to be able to be identified. In the frame image, for example, a mask area (a square area including a face image) of a face image selected as an image to be masked by the automatic mask deciding is displayed with a green dash line frame 112, and a mask area of a face image selected as an image not to be masked is displayed with a red dash line frame 114. Meanwhile, a face image to be masked and a face image not to be masked are not identified with colors, and may be identified with characters, codes, or figures, and may be identified with a kind of a frame line indicating an area of a face image, and the like.

In the mask decision screen 110, a user confirms a face image currently selected as an image to be masked and a face image currently selected as an image not to be masked, and decides whether or not the selection is appropriate. If the selection is not appropriate, the selection (manual mask deciding operation) for an image to be masked and an image not to be masked is executed with a manual operation for each of face images. In the mask decision screen 110 of FIG. 11, for example, if the cross button 32 is operated in up and down directions, the selected face image is sequentially switched, and a thumbnail image corresponding to a currently-selected face image in the thumbnail image display in the right side of the mask decision screen 110 is displayed as a different aspect from others, and which face image is currently selected is illustrated. Thereby, after causing a desired face image to be selected, the user selects whether the selected face image is to be masked or not to be masked by operating the cross button 32 in left and right directions depending on the guidance information under the screen. The selection whether each of face images is to be masked or not to be masked is executed by repeating such an operation (step S62). When the selecting operation is terminated, for example, the BACK button 38 is pushed.

Thereby, when the manual mask deciding operation is applied to the first frame image, the CPU 60 (the mask deciding unit 86 of the CPU 60) detects the user operation with an operation signal from the operation unit 62, and sets each of face images to any one of an image to be masked and an image not to be masked depending on the user operation. Meanwhile, when the result of the automatic mask deciding is appropriate, and when the user does not change the selection whether any face image is to be masked or not to be masked, the result of the automatic mask deciding is directly adopted.

Next, the CPU 60 (the display image generating unit 90 of the CPU 60) generates an image for mask decision, the image obtained by attaching a mark for identifying an image to be masked and an image not to be masked to each of face images of a frame image, in which a face image of a new person appears, of frame images whose face images are detected, and outputs the image signal to the displaying unit 68 to cause the liquid crystal monitor 28 to display the mask decision screen 110 configured as FIG. 11 (step S64).

Here, in FIG. 11, for example, a face image of an area 116 is a face image of a person which newly appears, and the face image is displayed with a mark which can distinguish the face image from a face image of other person which has already appeared. For example, a mask area of the face image of a person which newly appears is displayed with a blue dash line frame 116 which is different from that of a mask area of other face image.

In the mask decision screen 110, the user selects whether each of face images is to be masked or not to be masked as the operation in the mask decision screen 110 when the first frame image is displayed (step S66). Meanwhile, actually, it is enough to select whether only a face image of a person which newly appears is to be masked or not to be masked.

On the other hand, the CPU 60 (the mask deciding unit 86 of the CPU 60) detects a user operation with an operation signal from the operation unit 62, and sets each of face images to any one of an image to be masked and an image not to be masked depending on the user operation.

The above processing of step S64 and step S66 are sequentially repeated for the frame images in which the face image of a new person appears. When the above manual mask deciding operation is terminated for all of the frame images, the CPU 60 (the mask processing unit 88 of the CPU 60) masks a face image selected as an image to be masked for each frame image. The CPU 60 (the display image generating unit 90 of the CPU 60) generates a masked moving image, and causes liquid crystal monitor 28 to display the moving image signal through the displaying unit 68 (step S68).

The user confirms the masked photographed image with the preview-displaying, and if the user confirms that the photographed image is not appropriately masked, the user executes a reselecting operation (indicating operation for executing a mask deciding operation again). Thereby, it returns to a manual mask deciding operation at step S66.

On the other hand, in the preview-displaying of step S68, when the user executes a prescribed operation indicating that it is confirmed that the photographed image is appropriately masked, the CPU 60 (the recorded reproduced signal processing unit 82 of the CPU 60) converts the masked photographed image to data to be recorded (transmitted), and transfers the data to a communication line through the transmitting unit 70 (step S70).

Meanwhile, in the above processing of the flowchart, while the preview-displaying is executed at step S68, the transmitting at step S70 may be executed without executing the preview-displaying.

While, in the above processing, the CPU 60 decides whether each detected face image is to be masked or not to be masked with both of the automatic mask deciding and the manual mask deciding operation, either one may be executed.

Figure 12:
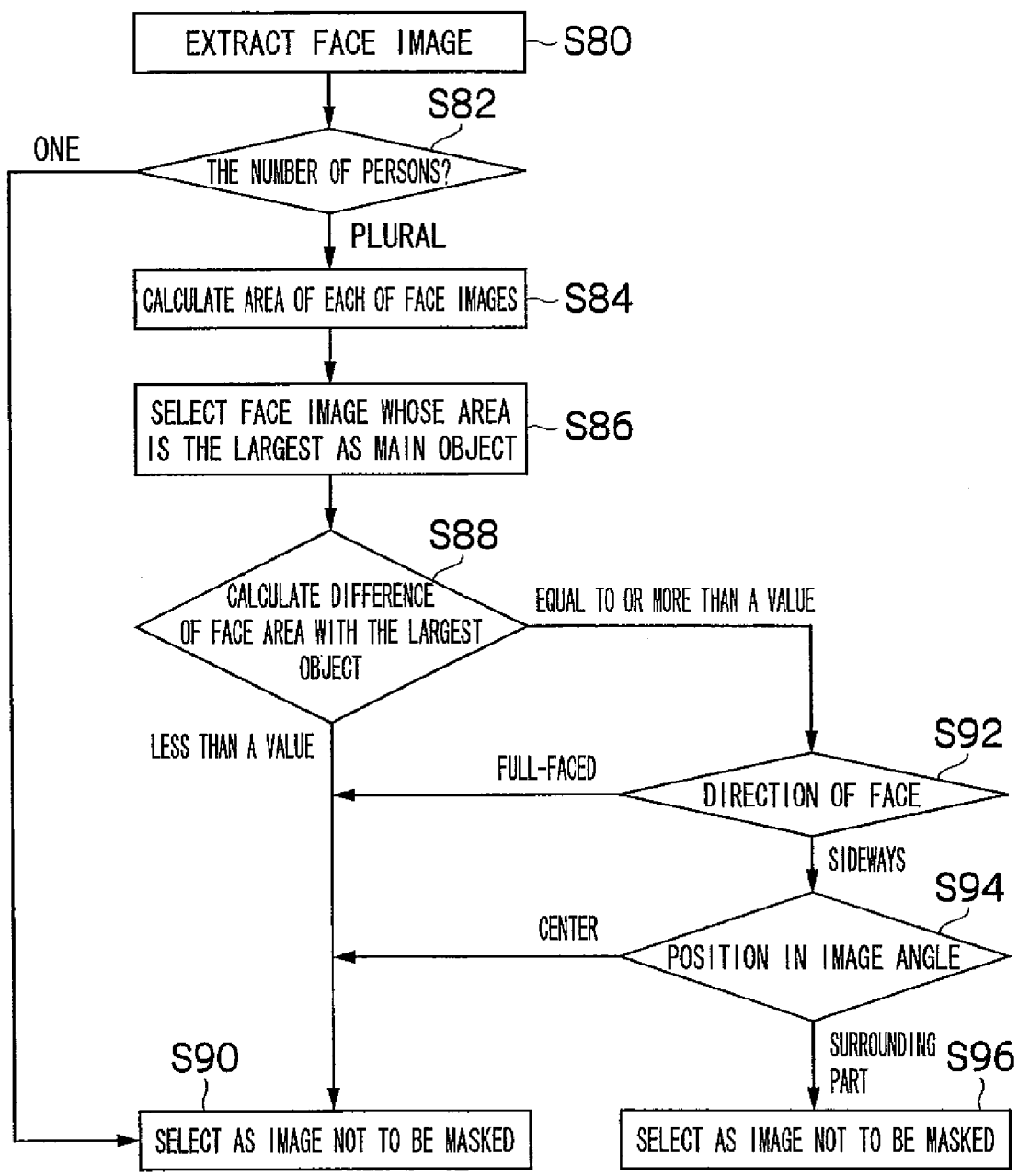
FIG. 12 is a flowchart illustrating an aspect of a procedure of an automatic mask deciding.

Next, actual content of the automatic mask deciding illustrated at step S26 of FIG. 4, FIG. 6, FIG. 7, FIG. 8, and FIG. 9, and step S54 of FIG. 10 will be described. FIG. 12 is a flowchart illustrating an aspect of a procedure of the automatic mask deciding.

As described in the flowcharts of FIG. 4, and the like, when a photographed image (including a moving image) is inputted from the imaging element 50, and a face image of a person is extracted from the photographed image (step S80), the following processing is executed in the automatic mask deciding.

First, the CPU 60 (the mask deciding unit 86 of the CPU 60) decides the number of persons of face images extracted from the photographed image (step S82). When the number is decided to be one, it is highly possible on a photographing composition that the person is intentionally photographed, so that the face image is selected as an image not to be masked (step S90).

On the other hand, when the number is decided to be plural an area of each of face images is calculated (step S84). Subsequently, the face image whose area is the largest is selected as a main object (step S86). A difference of an area of a face image (face area) between each of face images and the main object is calculated, and the largeness of the difference of the face area is decided (step S88).

At step S88, when the difference of the face area is decided to be less than a prescribed value, it can be decided that the face image appears with the largeness which is similar to that of the main object in the scope of an image angle of the whole of photographed image, and it is highly possible on a photographing composition that the person is intentionally photographed, so that the face image is selected as an image not to be masked (step S90).

On the other hand, at step S88, when the difference of the face area is decided to be equal to or more than the prescribed value, subsequently, the direction of the face is decided (step S92). When the face is decided to be fill-faced, it is highly possible on a photographing composition that the person is intentionally photographed (the person is conscious of being photographed), so that the face image is selected as an image not to be masked (step S90). When the face is decided not to be full-faced, but to be sideways, and the like, subsequently, the position within an image angle of the whole of photographed image is decided (step S94). When the position is decided to be in the center, it is highly possible on a photographing composition that the person is intentionally photographed, so that the face image is selected as an image not to be masked (step S90). When the position is decided to be in the surrounding part, it is highly possible on a photographing composition that the person is not intentionally photographed, so that the face image is selected as an image to be masked to guard the privacy (step S96).

As described above, it is possible to appropriately select a face image to be masked and a face image not to be masked by deciding whether a face image extracted from the photographed image is to be masked or not to be masked based on the estimation of the importance of the face image on the photographing composition. That is, an area of a face image, a direction of a face, and a position of a face in the image angle are designated as factors for estimating the importance on the photographing composition, and as the area of a face image is larger, the direction of a face is more full-faced, and the position of a face in the image angle is more central, the importance on the photographing composition is higher, and it is more possible that the person is intentionally photographed, so that it becomes appropriate to select the face image as an image not to be masked. However, factors other than the above factors may be included to estimate the importance on the photographing composition, and the face image may be decided to be masked or not to be masked based on any one or a plurality of the above factors.

In the above processing of the flowcharts, when the difference is less than a prescribed value as comparing an area of a face image with that of a main object whose area is the largest, the face image is designated as an image not to be masked. However, the face image not to be masked may be decided with a ratio instead of a difference, and may be decided with a absolute value.

Figure 13:
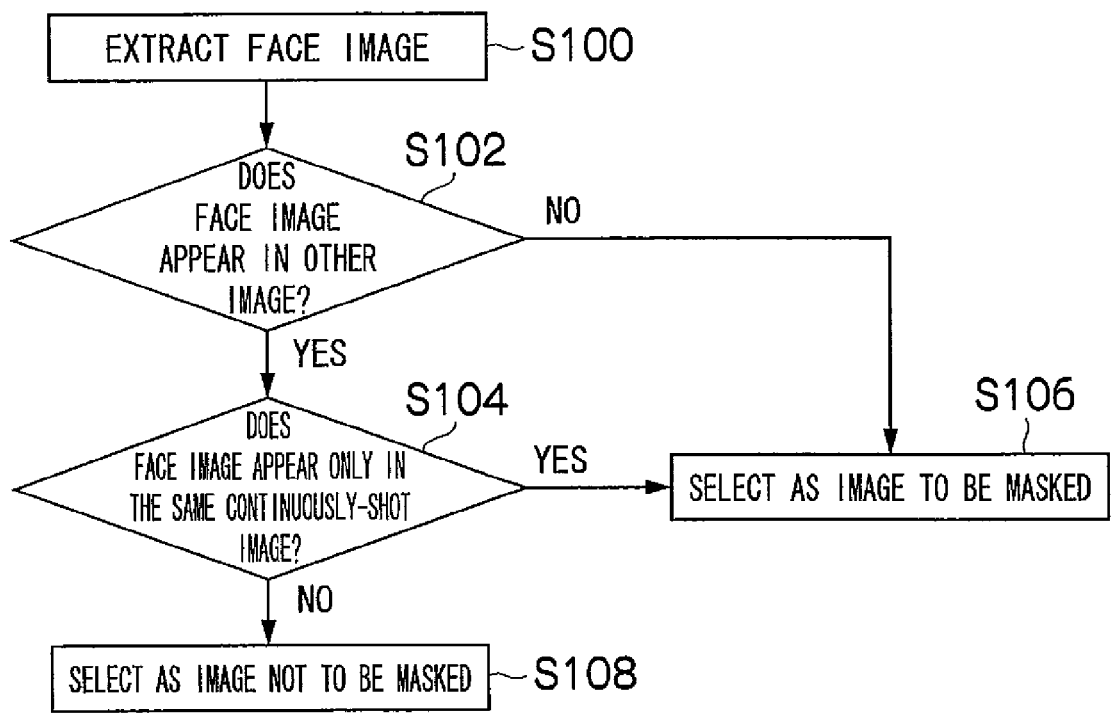
FIG. 13 is a flowchart illustrating an aspect of a procedure of the automatic mask deciding.

FIG. 13 is a flowchart illustrating an aspect of a procedure of the automatic mask deciding.

As described in the flowcharts of FIG. 4, and the like, when a photographed image (including a moving image) is inputted from the imaging element 50, and a face image of a person is extracted from the photographed image (step S100), the following processing is executed in the automatic deciding.

First, the CPU 60 (the mask deciding unit 86 of the CPU 60) decides whether or not a face image of a person whose face image is the same as a face image extracted from the photographed image appears in other photographed image recorded in the storing memory and the buffer memory 66 (step S102). When the decision is NO, it is highly possible that the person is not intentionally photographed, but accidentally photographed, so that the face image is selected as an image to be masked (step S106).

On the other hand, when the decision is YES at step S102, it is decided whether or not the photographed images in which a face image of the same person appears are included only in continuously-shot photographed images (step S104). When the decision is YES, it is highly possible that the person is not intentionally photographed, but accidentally photographed, so that the face image is selected as an image to be masked (step S106). On the other hand, when the decision is NO, it is highly possible that the person is intentionally photographed, so that the face image is selected as an image not to be masked (step S108).

At step S102 of the above flowchart, as a method for deciding whether or not a face image of a person whose face image is the same as a face image extracted from the photographed image appears in other photographed image, the face image may be compared with face images of all the photographed images recorded in the storing memory, and the like, and alternatively, a library for each person of face images extracted from the photographed images recorded in the storing memory is generated, and the face image may be compared with the face images in the library. The number of the face images to be compared becomes small, and a decision time is shortened by generating the library. The number of frames of other photographed images in which the face image appears can be freely set to cause the face image to be masked. It is preferable to display information regarding the number of frames of other photographed images in which a face image of the same person whose face image is the same as each of face images appears in the mask decision screen of FIG. 5, and the like.

However, even if the number of face images of the same person is plural, when the face images are included in a series of continuously-shot images, it is necessary to delete such face images from the number of frames of face images of the same person. Thus, when a library is generated, even if a plurality of frames of face images of the same person are detected from a series of continuously-shot images, such face images may be counted as one face image. When the face image is compared with face images of all the photographed images, it is preferable that face images of the same person of the same continuously-shot images are not counted as the number of frames.

Figure 14:
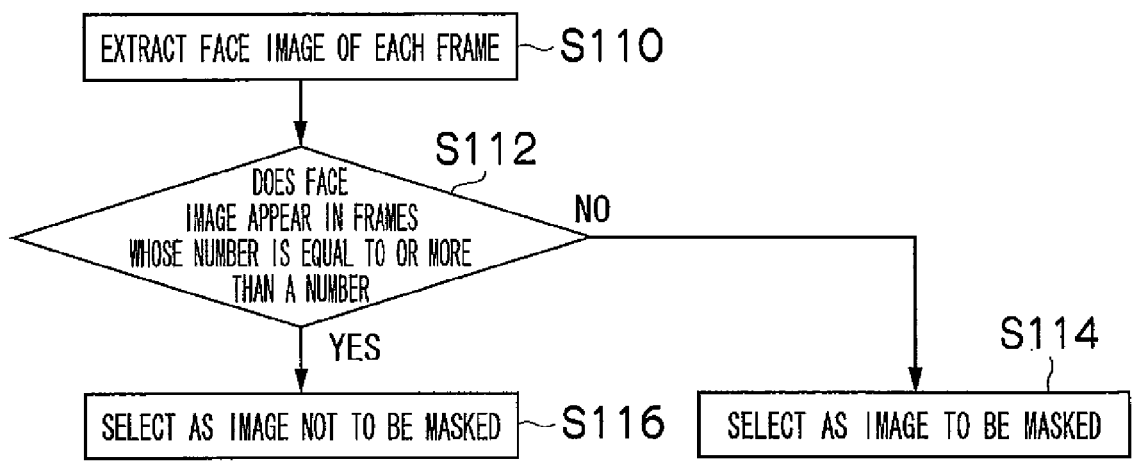
FIG. 14 is a flowchart illustrating an aspect of a procedure of the automatic mask deciding for a moving image.

FIG. 14 is a flowchart illustrating an aspect of a procedure of the automatic mask deciding for a moving image.

When a moving image is photographed (a moving image is inputted), and a face image of a person is extracted from each frame image of the photographed moving image (step S110), in each of face images extracted from each frame image, the CPU 60 (the mask deciding unit 86 of the CPU 60) decides whether or not a face image of the same person appears in frames whose number is equal to or more than a prescribed number (step S112).

When the decision is NO, the face image is selected as an image to be masked (step S114). On the other hand, when the decision is YES, the face image is selected as an image not to be masked (step S116).

With the above processing, it is appropriately decided whether or not a face image in a moving image is intentionally photographed, and it is appropriately selected whether each of face images is to be masked or not to be masked.

Next, the processing for displaying a mask decision screen for executing the manual mask deciding operation for a moving image at step S60 and step S64, and the like of FIG. 10 will be described.

Figure 15:
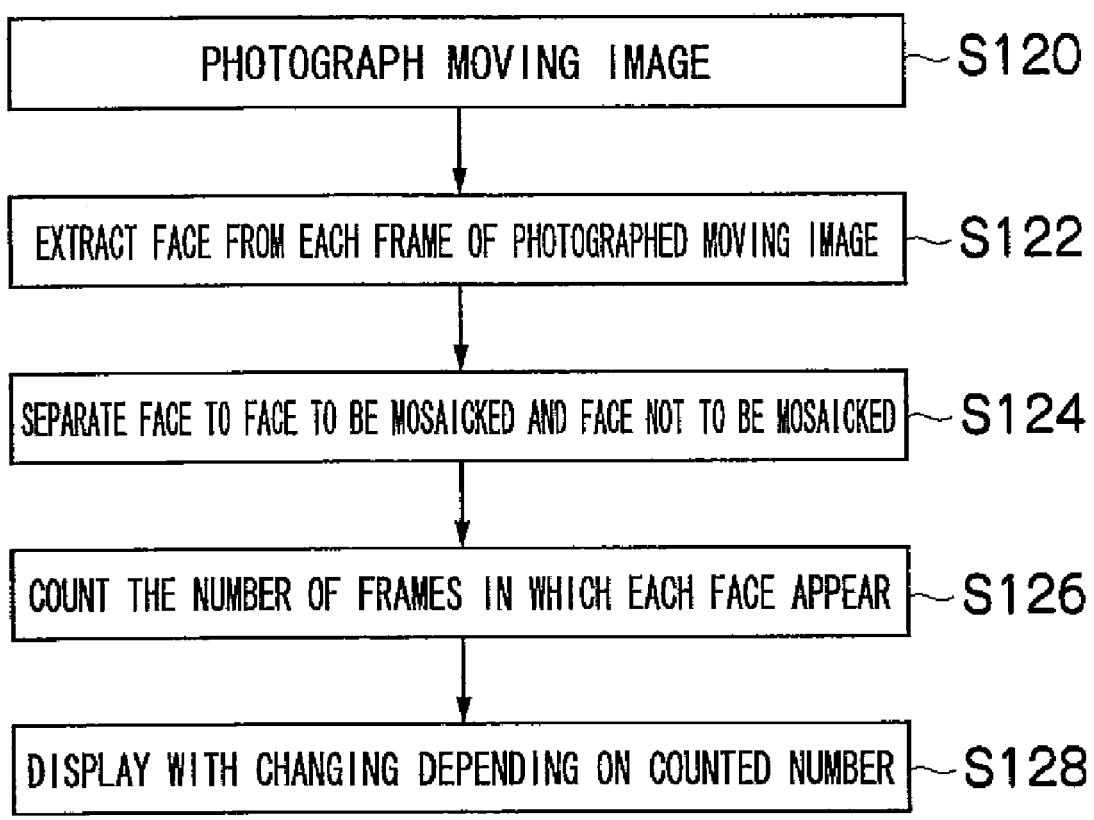
FIG. 15 is a flowchart illustrating an aspect of a procedure for displaying a mask decision screen for a moving image.

FIG. 15 is a flowchart illustrating an aspect of a procedure for displaying a mask decision screen for a moving image. When a moving image is photographed (a moving image is inputted) (step S120), the CPU 60 (the face image extracting unit 84 of the CPU 60) extracts (detects) a face image of a person from each frame (a frame image) of a photographed moving image (step S122). The CPU 60 (the mask deciding unit 86 of the CPU 60) executes the automatic mask deciding to separate the face image to a face image to be masked and a face image not to be masked (step S124).

Next, the CPU 60 (the display image generating unit 90 of the CPU 60) counts the number of frame images (the number of frames) in which a face image of the same person appears for each of face images extracted from each frame image (step S126). When a mask decision screen (refer to FIG. 11) in which a user executes the manual mask deciding operation selecting whether each of face images is to be masked or not to be masked is displayed in the liquid crystal monitor 28, in the frame image displayed in the mask decision screen, a face image of each person is displayed in a size depending on the number of frames counted at step S126 (step S128). For example, as the number of frames in which a person appears is more, a face image of the person is displayed larger.

Figure 16:
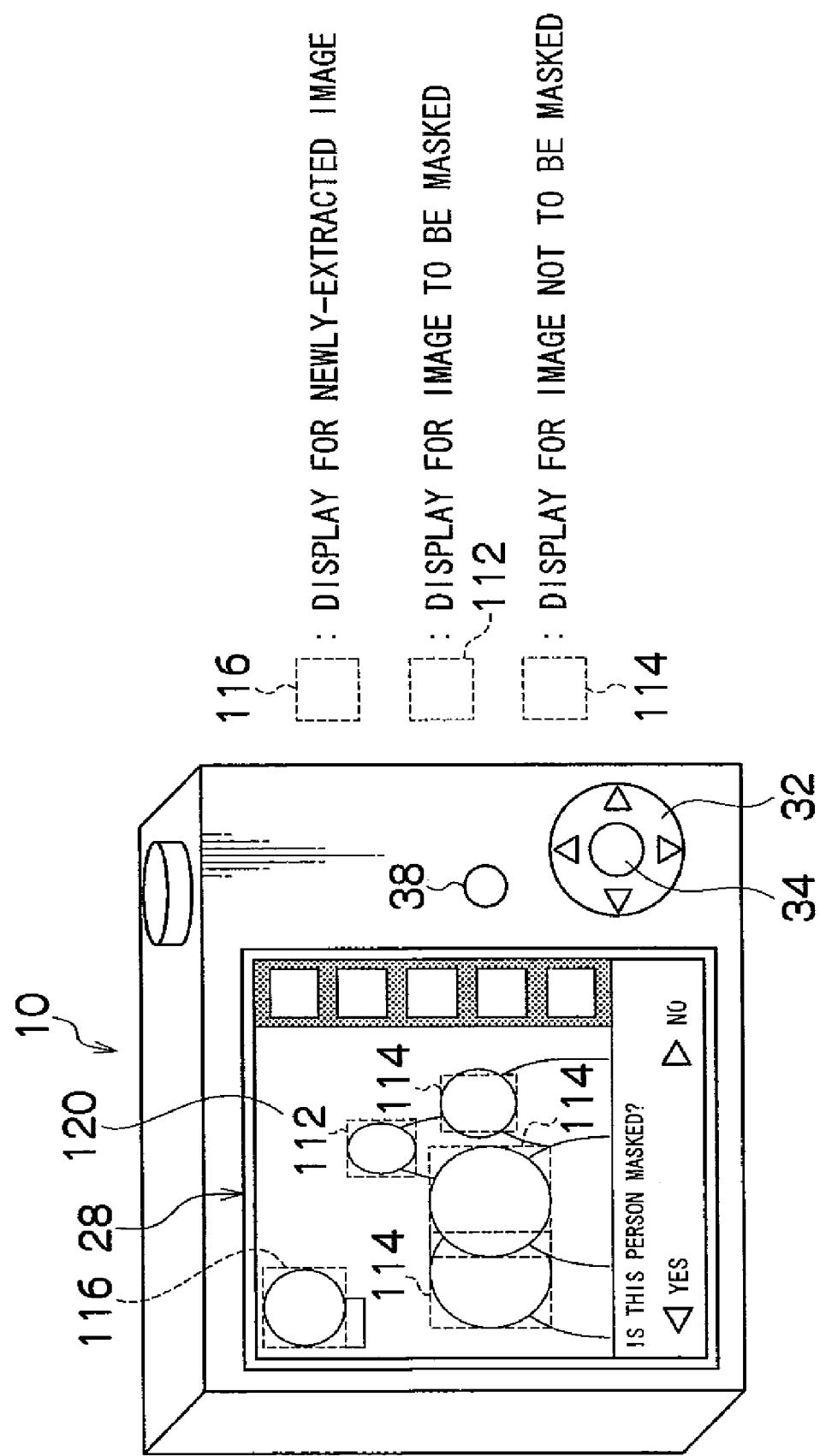
FIG. 16 is a diagram exemplifying the mask decision screen in case that a user selects to be masked/not to be masked in FIG. 15.

Meanwhile, when a frame image in which a face image of a new person appears is displayed in the mask decision screen at step S64 of FIG. 10, as illustrated in a mask decision screen 120 of FIG. 16, the size of a face image, and the like may be changed depending on the number of frames in which only a face image of the person appeals. A configuration of the mask decision screen 120 of FIG. 16 is the same as that of the mask decision screen 110 of FIG. 11, so that the description will be omitted.

When a frame image in which a face image of a new person is displayed in the mask decision screen at step S64 of FIG. 10, the size of a face image of the newly-appeared person may be displayed unconditionally larger than the original size.

As described above, depending on the number of frames, the size of a face image is not changed, but other factor such as the brightness or the density of the face image may be changed.

Figure 17:
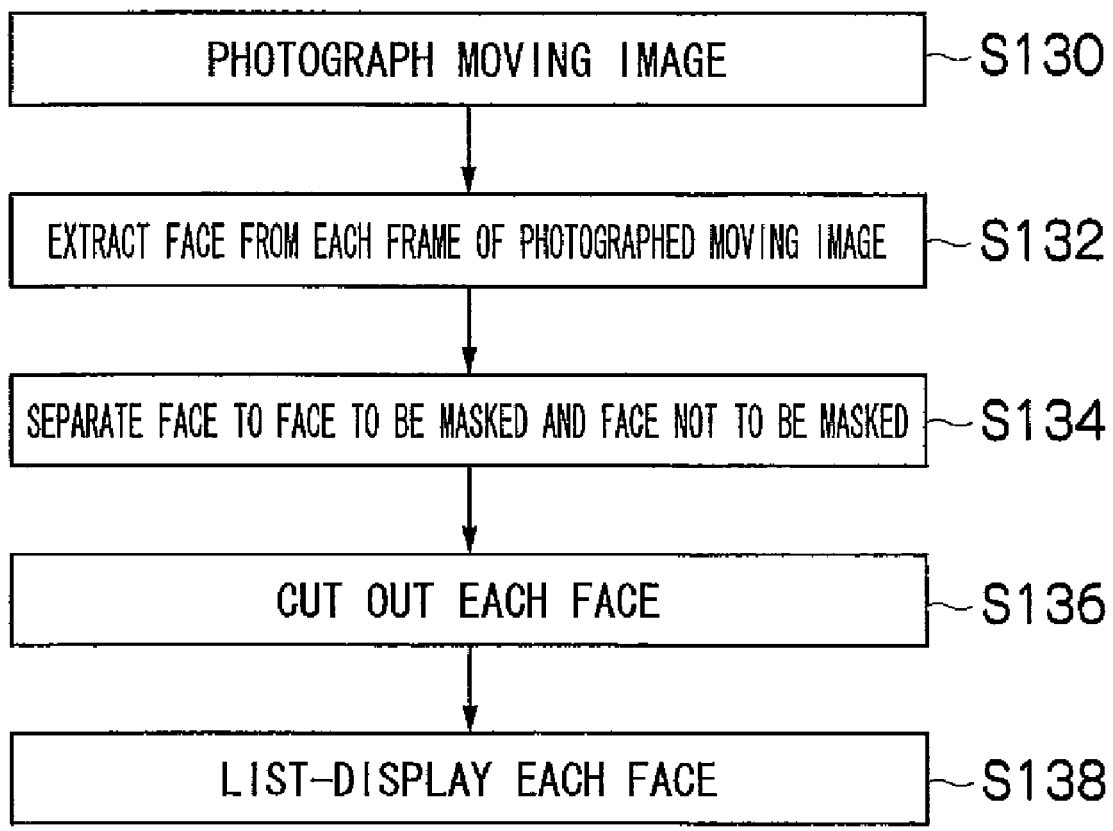
FIG. 17 is a flowchart illustrating an aspect of a procedure for displaying the mask decision screen for a moving image.

FIG. 17 is a flowchart illustrating an aspect of a procedure for displaying the mask decision screen for a moving image. When a moving image is photographed (a moving image is inputted) (step S130), the CPU 60 (the face image extracting unit 84 of the CPU 60) extracts (detects) a face image of a person from each frame (frame image) of a photographed moving image (step S132). The CPU 60 (the mask deciding unit 86 of the CPU 60) executes the automatic mask deciding to separate the face image to a face image to be masked and a face image not to be masked (step S134).

Next, the CPU 60 (the display image generating unit 90 of the CPU 60) cuts out each of face images extracted from each frame image from the photographed image (step S136). Such cut out face images are list-displayed in the liquid crystal monitor 28 as a mask decision screen in which a user executes the manual mask deciding operation for selecting whether each of face images is to be masked or not to be masked (step S138).

Figure 18:
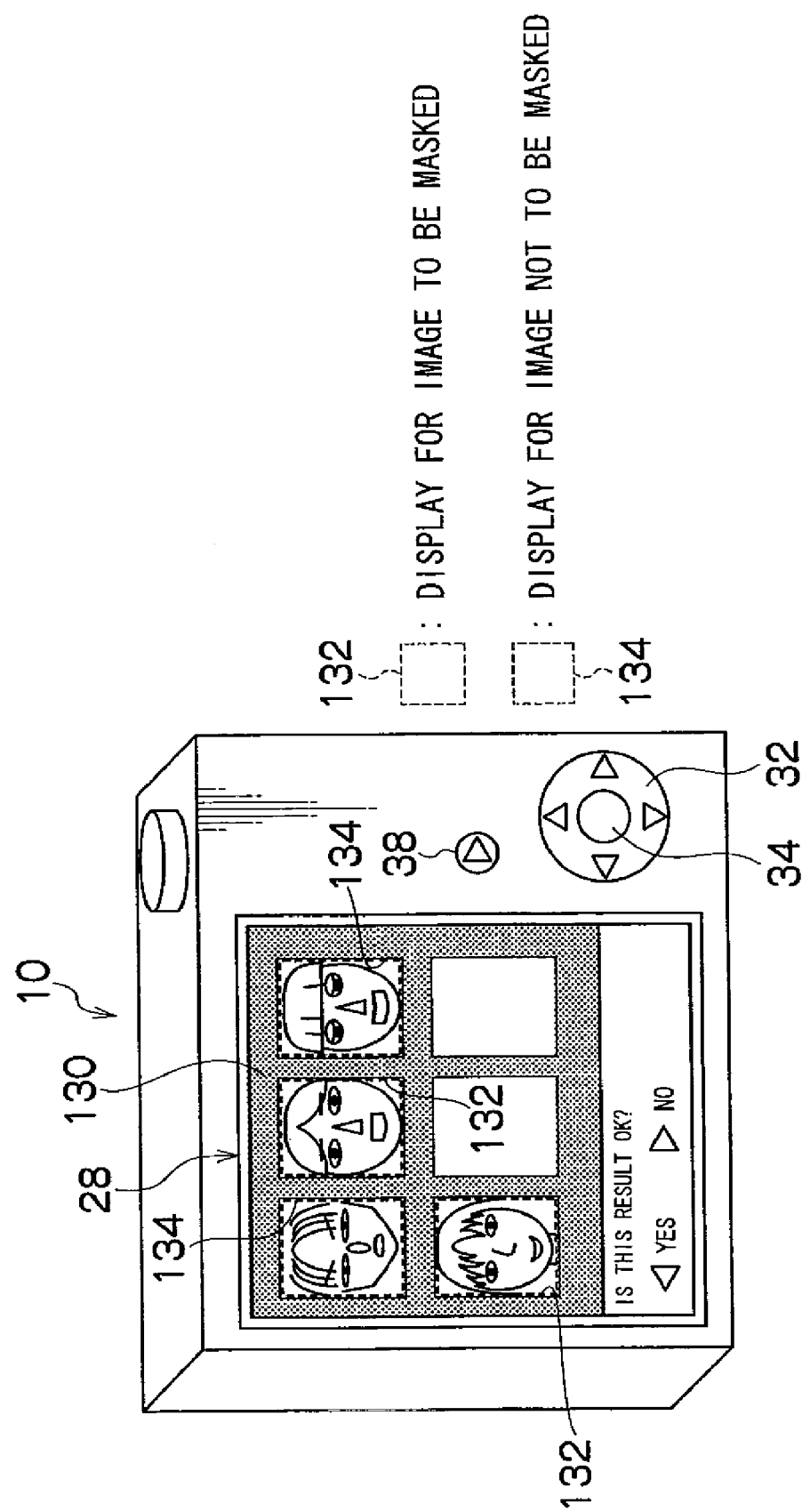
FIG. 18 is a diagram exemplifying the mask decision screen in case that a user selects to be masked/not to be masked in FIG. 17.

FIG. 18 is a diagram exemplifying the mask decision screen. In FIG. 18, face images extracted and cut out from each frame image are list-displayed in a mask decision screen 130, for example, an outline of a face image currently selected as an image to be masked is displayed with a green dash line frame 132, and an outline of a face image currently selected as an image not to be masked is displayed with a red dash line frame 134. In the mask decision screen 130, a user can cause a desired face image to be selected by operating the cross button 32 in up and down directions, and can set the selected face image to any one of an image to be masked and an image not to be masked by operating the cross button 32 in left and right directions.

As described above, as illustrated in FIG. 5 and FIG. 11, the mask decision screen may not display just a photographed image, but list-display only face images, and a user may switch an aspect for displaying just a photographed image as in FIG. 5, and the like, and an aspect for list-displaying only face images as in FIG. 18.

Meanwhile, in the above flowchart, the order of step S134 and step S136 may be reversed. When each of face images is list-displayed as the mask decision screen 130 of FIG. 18, it is desirable to adjust the size of each of face images so that the size of each of face images becomes constant. While it is considerable that such an order that each of face images is lined up corresponds to a time order of a frame image in which each of face images appears, it is preferable that a user can select the order in which the oldest is the first, the order in which the newest is the first, and the like.

Figure 19:
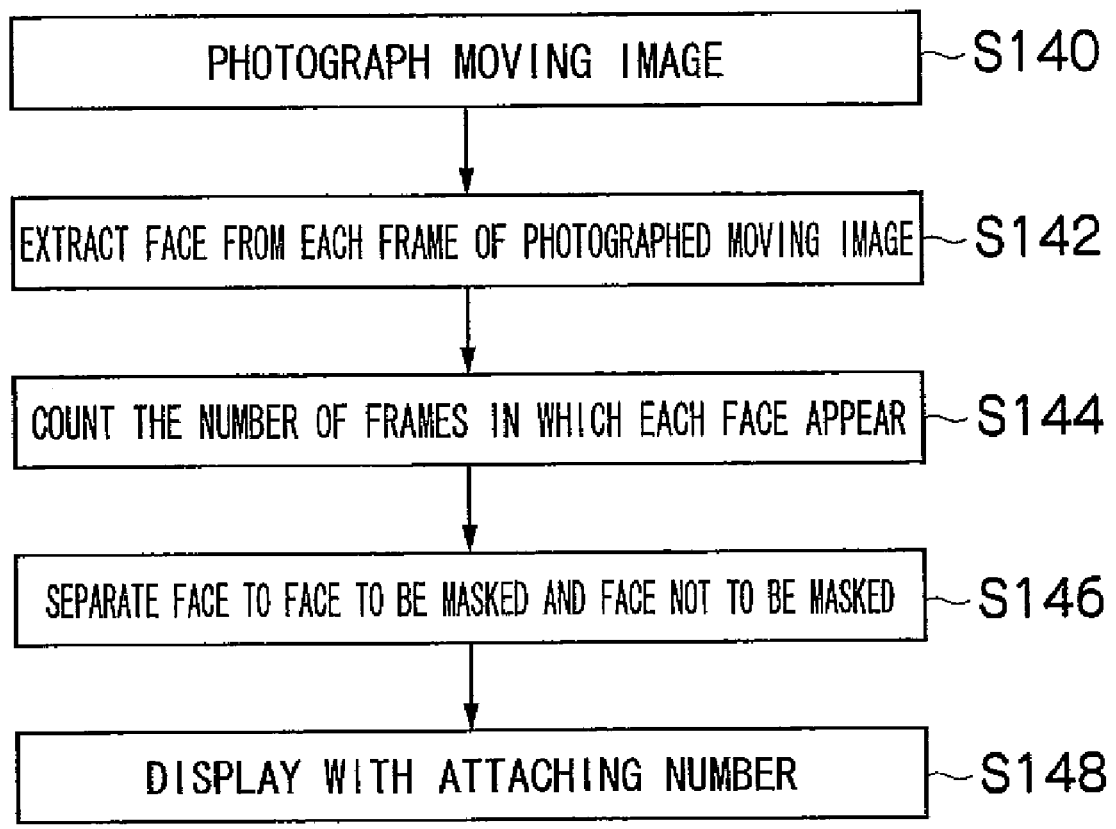
FIG. 19 is a flowchart illustrating an aspect of a procedure for displaying the mask decision screen for a moving image.

FIG. 19 is a flowchart illustrating an aspect of a procedure for displaying the mask decision screen for a moving image. When a moving image is photographed (step S140), the CPU 60 (the face image extracting unit 84 of the CPU 60) extracts (detects) a face image of a person from each frame (frame image) of the photographed moving image (step S142).

Next, the CPU 60 (the display image generating unit 90 of the CPU 60) counts the number of frame images (the number of frames) in which a face image of the same person for each of face images extracted from each frame image (step S144). The CPU 60 (the mask deciding unit 86 of the CPU 60) executes the automatic mask deciding to separate each of face images to a face image to be masked and a face image not to be masked (step S146).

Next, when displaying the mask decision screen (refer to FIG. 11 and FIG. 18) in which a user executes the manual mask deciding operation for selecting whether each of face images is to be masked or not to be masked in the liquid crystal monitor 28, the CPU 60 (the display image generating unit 90 of the CPU 60) displays the mask decision screen as adding the number of frames counted at step S144 to a face image of each person displayed in the mask decision screen (step S148).

Figure 20:
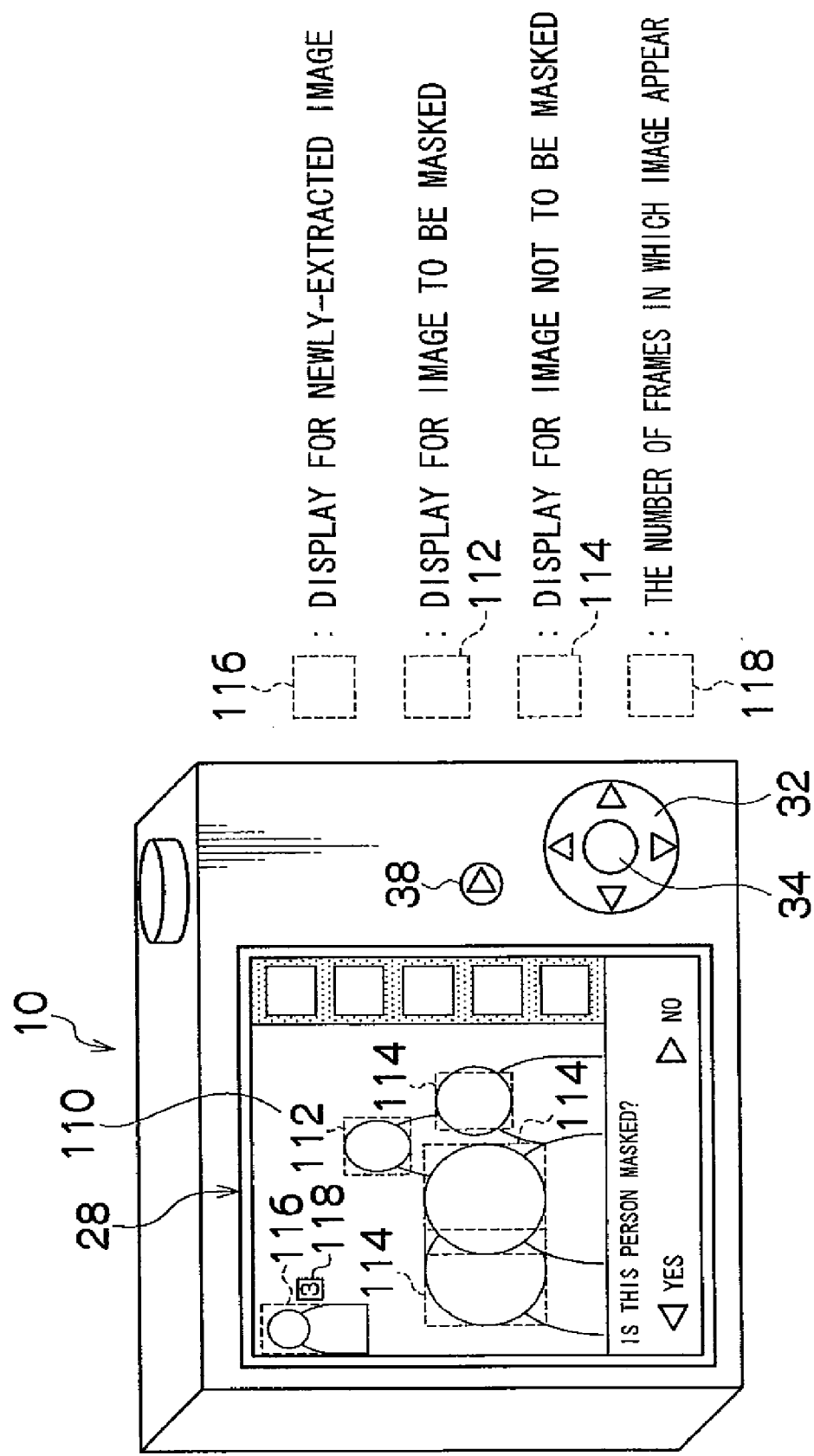
FIG. 20 is a diagram exemplifying the mask decision screen in case that a user selects to be masked/not to be masked in FIG. 19.
Figure 21:
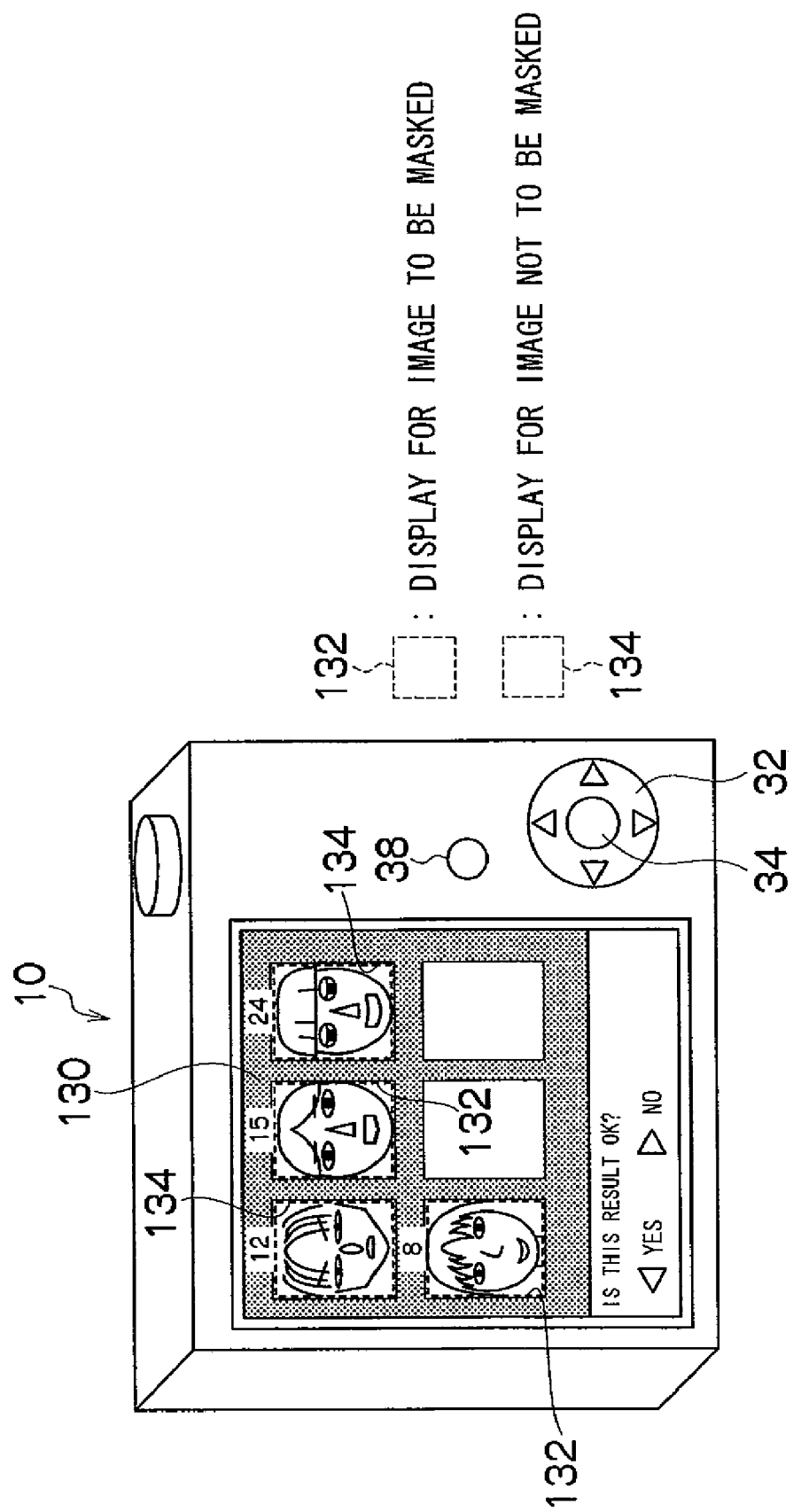
FIG. 21 is a diagram exemplifying the mask decision screen in case that a user selects to be masked/not to be masked in FIG. 19.

In a mask decision screen configured as the mask decision screen 110 of FIG. 11, FIG. 20 is an example for displaying a face image (a face image of a dash line frame 116) of a newly-appeared person as adding the number of frames (a value in a frame 118) in which the face image appears to the face image, and in a mask decision screen configured as the mask decision screen 130 of FIG. 18, and FIG. 21 is an example for displaying a face image as adding the number of frames to the upper side of each list-displayed face image.

Meanwhile, instead of the number of frames in which a person of each of face images appears, a time (second) in which the person appears may be displayed. The time can be calculated from the number of frames in which the person appears.

Next, such a case will be described that a mask decision screen for a moving image is displayed, particularly, a face image is list-displayed as in FIG. 18.

Figure 22:
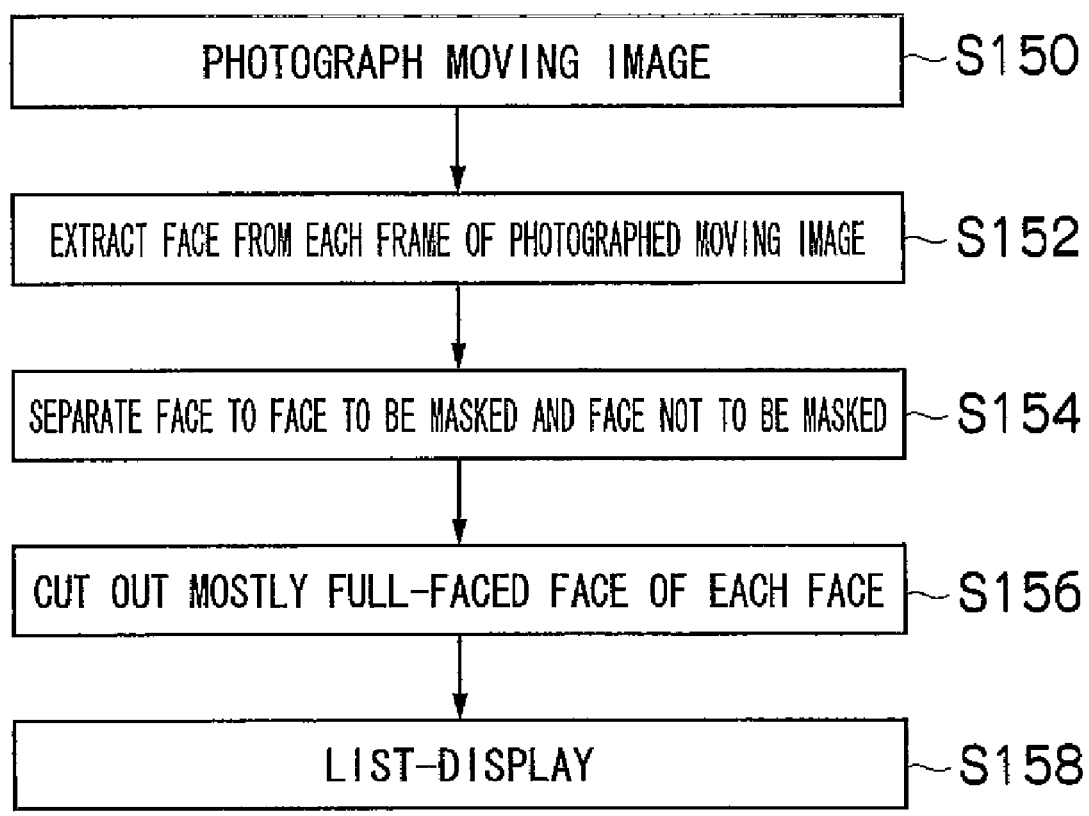
FIG. 22 is a flowchart illustrating an aspect of a procedure in case that face images are list-displayed for displaying the mask decision screen for a moving image.

FIG. 22 is a flowchart illustrating an aspect of a procedure in case that face images are list-displayed for displaying a mask decision screen for a moving image. When a moving image is photographed (a moving image is inputted) (step S150), the CPU 60 (the face image extracting unit 84 of the CPU 60) extracts (detects) a face image of a person from each frame (frame image) of a photographed moving image (step S152). The CPU 60 (the mask deciding unit 86 of the CPU 60) executes the automatic mask deciding to separate the face image to a face image to be masked and a face image not to be masked (step S154).

Next, the CPU 60 (the display image generating unit 90 of the CPU 60) cuts out each of face images extracted from each frame image from a photographed image (step S156). In this case, when a face image of the same person appears in a plurality of frame images, the face image is cut out, which is mostly full-faced. As a mask decision screen in which a user executes the manual mask deciding operation selecting whether each of face images is to be masked or not to be masked, the cut out face images are list-displayed in the liquid crystal monitor 28 as FIG. 18 (step S158).

Thereby, it becomes easy for a user to decide a person of each of face images in the mask decision screen.

Figure 23:
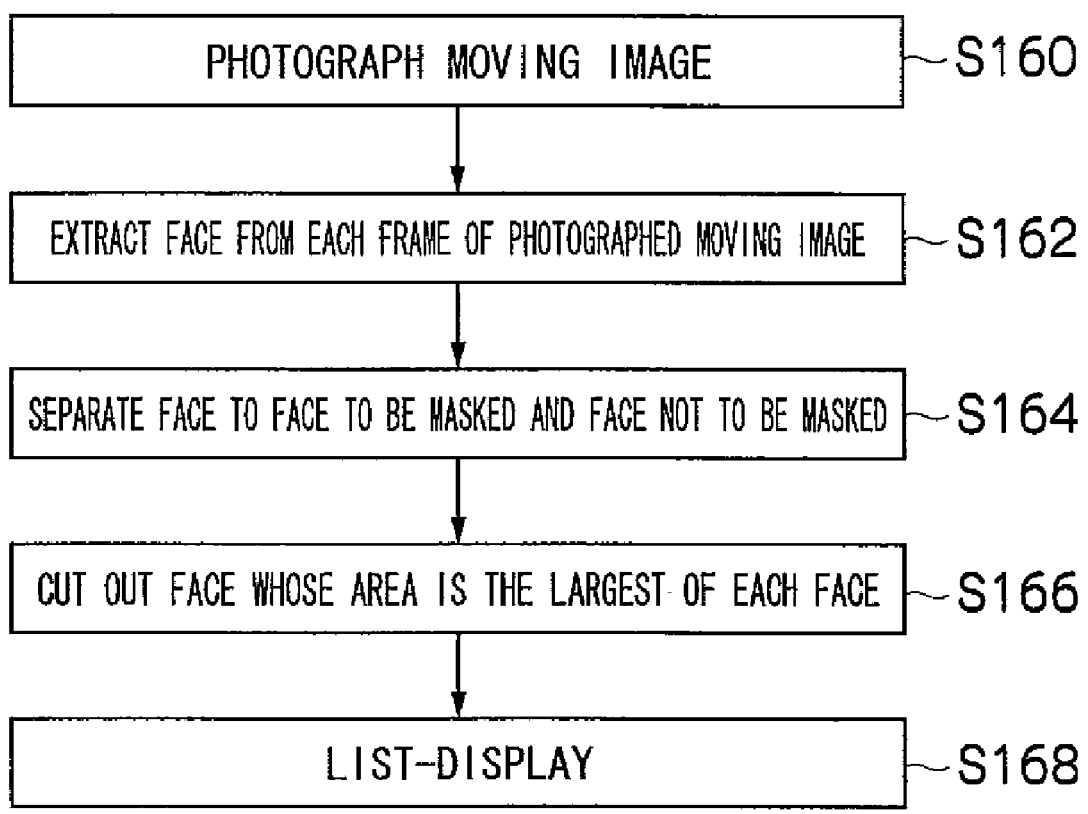
FIG. 23 is a flowchart illustrating an aspect of a procedure in case that face images are list-displayed for displaying the mask decision screen for a moving image.

FIG. 23 is a flowchart illustrating an aspect of a procedure in case that face images are list-displayed for displaying the mask decision screen for a moving image. When a moving image is photographed (step S160), the CPU 60 (the face image extracting unit 84 of the CPU 60) extracts (detects) a face image of a person from each frame (frame image) of a photographed moving image (step S162). The CPU 60 (the mask deciding unit 86 of the CPU 60) executes the automatic mask deciding to separate the face image to a face image to be masked and a face image not to be masked (step S164).

Next, the CPU 60 (the display image generating unit 90 of the CPU 60) cuts out each of face images extracted from each frame image from a photographed image (step S166). In this case, when a face image of the same person appears in a plurality of frame images, the face image is cut out, whose area is the largest. As a mask decision screen in which a user executes the manual mask deciding operation selecting whether each of face images is to be masked or not to be masked, the cut out face images are list-displayed in the liquid crystal monitor 28 as FIG. 18 (step S168).

Thereby, it becomes easy for a user to decide a person of each of face images in the mask decision screen.

In the above embodiments, while a masked photographed image (including a moving image) is transferred to an external device, without limiting to such embodiments, information (data) of a non-masked original image, and information of a mask area for masking the original image may be transmitted. In this case, the masking is executed in the external device obtaining the original image and the information of a mask area, so that the mask processing unit 88 becomes unnecessary in the camera 10. FIG. 24 is a diagram illustrating an example of a mask area 152 in the whole image angle area 150 of a photographed image to be transmitted. As illustrated in FIG. 24, when the mask area 152 is designated to be a quadrangle, the mask area 152 can be specified with two points of a coordinate (X1, Y1) of the left and upper corner and a coordinate (X2, Y2) of the right and down corner. When the mask area is designated to be a circle, information of a center and a radius of the circle may be attached to the original image to be transmitted, when the mask area is designated to be an ellipse, information of a center, a major axis, and a semi-minor axis of the ellipse may be attached to the original image to be transmitted, and when the mask area is designated to be a polygon other than a quadrangle, some coordinates of the corners may be attached to the down image to be transmitted.

When an image and information of a mask area are transmitted, as in FIG. 24, the image to be transmitted and a frame indicating the mask area on the image are displayed on the liquid crystal monitor 28, and a user may confirm the image and the mask area.

Furthermore, when an image and information of a mask area are transmitted, information of a mask pattern for masking the mask area may be attached.

In the above embodiments, while such a case is described that the present invention is applied to a digital camera, the present invention can be applied to an apparatus provided with a camera function and a data communicating function (data communication not only by wireless but also by wire) such as a portable telephone with a camera. The present invention can be also applied to an apparatus without a photographing device in the own apparatus. That is, in the above embodiments, while such a case is described that an image is inputted with a photographing device included in the own apparatus as a device inputting an image, the present invention can be also applied to an apparatus inputting image data from other apparatus as a device inputting an image. For example, the present invention can be applied to an arbitrary image processing apparatus which can include an image processing function and a data communicating function such as a personal computer.

What is claimed is:

1. An image processing apparatus, comprising:
   an image inputting device which inputs an image;
   a face image detecting device which detects a face image of a person from the image inputted by the image inputting device;
   an automatic mask deciding device which decides whether or not each face image is to be masked based on a size of each of the face images in an identical image compared to a face image with a maximum area in the identical image, a direction of each of the faces in each of the face images detected by the face image detecting device, or a number of other images in which a face image of a same person in the image appears;
   a transferring device which transfers an image obtained by masking an area of a face image which is decided to be masked by the automatic masking deciding device for the image inputted by the image inputting device to an external device, or transfers the image inputted by the image inputting device and information indicating the area of the face image which is decided to be masked by the automatic mask deciding device to an external device.

2. The image processing apparatus according to claim 1, wherein the automatic mask deciding device decides whether or not each of face images is to be masked based on a largeness, the number, a position in an image angle, or a direction of a face of each of face images detected by the face image detecting device.

3. The image processing apparatus according to claim 1, wherein the automatic mask deciding device decides whether or not an image to be decided is to be masked depending on whether or not a face image of the same person whose face image is the same as each of face images detected by the face image detecting device appears in a prescribed number of or more images of other already-recorded images.

4. The image processing apparatus according to claim 1, wherein when an image inputted by the image inputting device is a moving image including a plurality of frame images, the automatic mask deciding device decides whether or not each frame image is to be masked depending on whether or not a face image of the same person detected by the face image detecting device appears in a prescribed number or more frame images.

5. The image processing apparatus according to claim 1, wherein an image which is inputted by the image inputting device and is not masked is stored in a storing memory.

6. An image processing apparatus, comprising:

an image inputting device which inputs an image;

a face image detecting device which detects a face image of a person from the image inputted by the image inputting device;

a displaying device which displays an operation screen, which displays each area which is detected as a face image by the face image detecting device so as to be able to be identified, and in which a user inputs a decision whether or not each of the face images detected by the face image detecting device is to be masked;

a manual mask dividing device which decides whether or not each the face images detected by the face image detecting device is to be masked depending on a user operation on the screen of the displaying device;

a transferring device which transfers an image obtained by masking an area of a face image which is decided to be masked by the manual mask deciding device for the image inputted by the image inputting device to an external device, or transfers the image inputted by the image inputting device and information indicating the area of the face image which is decided to be masked by the manual mask deciding device to an external device;

wherein when an image inputted by the image inputting device is a moving image including a plurality of frame images, the displaying device sequentially displays the operation screen for a frame image in which a face image of a new person in the frame images detected by the face image detecting device appears.

7. The image processing apparatus according to claim 6, wherein such a mode is provided that the operation screen is automatically displayed in which a user inputs the decision whether or not each of face images detected by the face image detecting device is to be masked with the displaying device when an image is inputted by the image inputting device.

8. The image processing apparatus according to claim 6, wherein such a mode is provided that the operation screen is displayed in which a user inputs the decision whether or not each of face images detected by the face image detecting device is to be masked with the displaying device when an operation is executed which instructs that an image is transferred by the transferring device.

9. The image processing apparatus according to claim 6, wherein the displaying device displays a face image of a person who newly appears as the operation screen with the largeness or the density depending on the number of frame images in which the person appears.

10. The image processing apparatus according to claim 6, wherein the displaying device list-displays face images detected by the face image detecting device as the operation screen.

11. The image processing apparatus according to claim 10, wherein when an image inputted by the image inputting device is a moving image including a plurality of frame images, the displaying device displays an face image which is mostly full-faced of face images of the same person detected by the face image detecting device as the operation screen.

12. The image processing apparatus according to claim 10, wherein when an image inputted by the image inputting device is a moving image including a plurality of frame images, the displaying device displays an face image whose area is the largest of each of face images of the same person detected by the face image detecting device as the operation screen.

13. The image processing apparatus according to claim 6, wherein an image which is inputted by the image inputting device and is not masked is stored in a storing memory.

14. An image processing apparatus, comprising:

an image inputting device which inputs an image;

a face image detecting device which detects a face image of a person from the image inputted by the image inputting device;

an automatic mask deciding device which automatically decides whether or not each of face images detected by the face image detecting device is to be masked;

a displaying device which displays an operation screen for displaying each area detected as a face image by the face image detecting device so as to be able to be identified, and for displaying an area of a face image that is decided to be masked by the automatic mask deciding device, and an area of a face image that is decided not to be masked so as to be able to be identified, the operation screen through which a user inputs a decision whether or not each of face images detected by the face image detecting device is to be masked;

a manual mask deciding device which corrects the decision result by the automatic mask deciding device whether or not each of face images detected by the face image detecting device is masked depending on a user operation on a screen of the displaying device, and decides whether or not each image detected by the face image detecting device is to be masked; and a transferring device which transfers an image obtained by masking an area of a face image which is decided to be masked by the manual mask deciding device for the image inputted by the image inputting device to an external device, or transfers the image inputted by the image inputting device, and information indicating the area of the face image which is decided to be masked by the manual mask deciding device to an external device.

15. The image processing apparatus according to claim 14, wherein the automatic mask deciding device decides whether or not each of face images is to be masked based on a largeness, the number, a position in an image angle, or a direction of a face of each of face images detected by the face image detecting device.

16. The image processing apparatus according to claim 14, wherein the automatic mask deciding device decides whether or not an image to be decided is to be masked depending on whether or not a face image of the same person whose face image is the same as each of face images detected by the face image detecting device appears in a prescribed number or more images of other already-recorded images.

17. The image processing apparatus according to claim 14, wherein when an image inputted by the image inputting device is a moving image including a plurality of frame images, the automatic mask deciding device decides whether or not each frame image is to be masked depending on whether or not a face image of the same person detected by the face image detecting device appears in a prescribed number or more frame images.

18. The image processing apparatus according to claim 14, wherein such a mode is provided that the operation screen is automatically displayed in which a user inputs the decision whether or not each of face images detected by the face image detecting device is to be masked with the displaying device when an image is inputted by the image inputting device.

19. The image processing apparatus according to claim 14, wherein such a mode is provided that the operation screen is displayed in which a user inputs the decision whether or not each of face images detected by the face image detecting device is to be masked with the displaying device when an operation is executed which instructs that an image is transferred by the transferring device.

20. The image processing apparatus according to claim 14, wherein when an image inputted by the image inputting device is a moving image including a plurality of frame images, the displaying device sequentially displays the operation screen for the frame images, in which a face image of a new person appears, which is detected by the face image detecting device.

21. The image processing apparatus according to claim 20, wherein the displaying device displays a face image of a person who newly appears as the operation screen with the largeness or the density depending on the number of frame images in which the person appears.

22. The image processing apparatus according to claim 14, wherein the displaying device list-displays face images detected by the face image detecting device as the operation screen.

23. The image processing apparatus according to claim 22, wherein when an image inputted by the image inputting device is a moving image including a plurality of frame images, the displaying device displays an face image which is mostly full-faced of face images of the same person detected by the face image detecting device as the operation screen.

24. The image processing apparatus according to claim 22, wherein when an image inputted by the image inputting device is a moving image including a plurality of frame images, the displaying device displays an face image whose area is the largest of each of face images of the same person detected by the face image detecting device as the operation screen.

25. The image processing apparatus according to claim 14, wherein when an image inputted by the image inputting device is a moving image including a plurality of frame images, the displaying device displays each of face images detected by the face image detecting device as the operation screen with the number of frame images in which a face image of the same person appears.

26. The image processing apparatus according to claim 14, wherein an image which is inputted by the image inputting device and is not masked is stored in a storing memory.

27. An image processing apparatus, comprising:
an image inputting device which inputs an image;
a face image detecting device which detects a face image of a person from the image inputted by the image inputting device;
a displaying device which displays an operation screen, which displays each area which is detected as a face image by the face image detecting device so as to be able to be identified, and in which a user inputs a decision whether or not each of the face images detected by the face image detecting device is to be masked;
a manual mask deciding device which decides whether or not each of the face images detected by the face image detecting device is to be masked depending on a user operation on the screen of the displaying device;
a transferring device which transfers an image obtained by masking an area of a face image which is decided to be masked by the manual mask deciding device for the image inputted by the image inputting device to an external device, or transfers the image inputted by the image inputting device and information indicating the area of the face image which is decided to be masked by the manual mask deciding device to an external device;
wherein when an image inputted by the image inputting device is a moving image including a plurality of frame images, the displaying device displays each of the face images detected by the face image detecting device as the operation screen with the number of frame images in which a face image of the same person appears.

* * * * *